US012507020B2

(12) United States Patent
Ruparel et al.

(10) Patent No.: US 12,507,020 B2
(45) **Date of Patent: *Dec. 23, 2025**

(54) HEARING DEVICE TEST AND DIAGNOSTICS SYSTEM AND METHODS

(71) Applicant: Eargo, Inc., San Jose, CA (US)

(72) Inventors: Hardik Ruparel, Milpitas, CA (US); Iain Butler, Pleasant Hill, CA (US)

(73) Assignee: Eargo, Inc., San Jose, CA (US)

( * ) Notice: Subject to any disclaimer, the term of this patent is extended or adjusted under 35 U.S.C. 154(b) by 590 days.

This patent is subject to a terminal disclaimer.

(21) Appl. No.: 17/940,340

(22) Filed: Sep. 8, 2022

(65) Prior Publication Data

US 2023/0063186 A1 Mar. 2, 2023

Related U.S. Application Data

(63) Continuation of application No. 17/358,159, filed on Jun. 25, 2021, now Pat. No. 11,477,582.

(51) Int. Cl.
*H04R 25/00* (2006.01)

(52) U.S. Cl.
CPC ........... *H04R 25/30* (2013.01); *H04R 25/305* (2013.01); *H04R 25/505* (2013.01);
(Continued)

(58) Field of Classification Search
CPC .... H04R 25/30; H04R 25/305; H04R 25/505; H04R 25/554; H04R 25/60; H04R 25/654;
(Continued)

(56) References Cited

U.S. PATENT DOCUMENTS

| | | | |
|---|---|---|---|
| 6,671,643 | B2 | 12/2003 | Kachler et al. |
| 6,879,692 | B2 | 4/2005 | Nielsen et al. |

(Continued)

FOREIGN PATENT DOCUMENTS

| | | |
|---|---|---|
| EP | 2465270 | 8/2013 |
| EP | 3448064 | 2/2019 |

(Continued)

OTHER PUBLICATIONS

Agnew, "The Causes and Effects of Distortion and Internal Noise in Hearing Aids", Trends in Amplification, vol. 3, No. 3, 1998, pp. 82-118.

(Continued)

*Primary Examiner* — Huyen D Le
(74) *Attorney, Agent, or Firm* — Alan W. Cannon

(57) ABSTRACT

Systems and methods for detecting and diagnosing causes of subpar performance of a hearing device are provided for a user. The hearing device may include a housing, a receiver and a sound processor configured to send signals to the receiver. The receiver may be configured to output audio signals from the signals sent by the sound processor. A base unit may include a main body having a cradle formed therein. The cradle may be configured to receive the hearing device therein. A base unit microphone interfaces with the cradle and may be configured to receive output audio signals from the receiver when the hearing device is received in the cradle. The base unit microphone and the receiver remain in open communication with a space exterior of the base unit when the hearing device has been received in the cradle. A processor associated with the system may be configured to compare signal energy levels of test audio signals produced by the base unit microphone, in response to the audio signals received from the receiver, with signal energy levels of reference audio signals, and to indicate a blockage of the
(Continued)

receiver has occurred when a difference between the signal energy levels of test audio signals and the signal energy levels of reference audio signals exceeds a threshold difference.

16 Claims, 10 Drawing Sheets

(52) U.S. Cl.
CPC ........... *H04R 25/554* (2013.01); *H04R 25/60* (2013.01); *H04R 25/654* (2013.01); *H04R 25/70* (2013.01); *H04R 2225/55* (2013.01)

(58) Field of Classification Search
CPC .. H04R 25/70; H04R 29/004; H04R 2225/31; H04R 2225/39; H04R 2225/55
See application file for complete search history.

(56) References Cited

U.S. PATENT DOCUMENTS

| | | | | |
|---|---|---|---|---|
| 7,003,128 | B2 | 2/2006 | Boonen | |
| 7,949,144 | B2 * | 5/2011 | Harsch | H04R 25/30 381/317 |
| 10,045,128 | B2 | 8/2018 | Shennib | |
| 10,228,402 | B2 | 3/2019 | Krogsgaard et al. | |
| 11,477,582 | B1 * | 10/2022 | Ruparel | H04R 25/554 |
| 2007/0286429 | A1 | 12/2007 | Grafenberg et al. | |
| 2007/0286441 | A1 | 12/2007 | Harsch et al. | |
| 2010/0272273 | A1 | 10/2010 | Chua et al. | |
| 2014/0309549 | A1 | 10/2014 | Selig et al. | |
| 2016/0066822 | A1 | 3/2016 | Shennib et al. | |
| 2017/0311104 | A1 | 10/2017 | Cederberg et al. | |
| 2017/0350926 | A1 * | 12/2017 | Cederberg | H04R 25/305 |
| 2020/0260202 | A1 | 8/2020 | Cheng et al. | |
| 2021/0266688 | A1 | 8/2021 | Noergaard | |
| 2025/0184670 | A1 * | 6/2025 | Rivera Benois | H04R 25/305 |

FOREIGN PATENT DOCUMENTS

| | | |
|---|---|---|
| EP | 3522569 | 8/2019 |
| EP | 3675526 | 7/2020 |
| EP | 4002887 | 5/2022 |
| WO | 2011018086 | 2/2011 |
| WO | 2011029959 | 3/2011 |
| WO | 20190238800 | 12/2019 |

OTHER PUBLICATIONS

American National Standard, “Specification of Hearing Aid Characteristics”, ANSI S3.22-2003; 2003.

Auriemmo, “Using DSP to Screen Hearing Aid Component Defects”, The Hearing Review, Feb. 2003, pp. 1-4.

Eargo Max, User Informational Brochure, 2019, pp. 1-86.

Widex, “Consent Settings”, downloaded Apr. 8, 2021, pp. 1-11.

* cited by examiner

HEARING DEVICE TEST AND DIAGNOSTICS SYSTEM AND METHODS

This application is a continuation of co-pending application Ser. No. 17/358,159, filed Jun. 25, 2021, which application is hereby incorporated herein, in its entirety, by reference thereto and to which we claim priority under 35 U.S.C. Section 120.

FIELD OF THE INVENTION

This invention relates to the field of hearing devices. More particularly, this invention relates to systems and methods for checking and diagnosing various forms of damage to hearing devices.

BACKGROUND OF THE INVENTION

Damage to hearing devices such as hearing aids or other hearing devices may occur in transducers such as a receiver and/or a microphone through ear wax deposits or any foreign material clogging or partially clogging the microphone and/or receiver so that a reduced quantity and/or quality of sound transmission by the device results. Other forms of damage can occur when such devices are dropped, and instances of accidental dropping of devices are common. The impact experienced from a drop can have a detrimental effect on the output/gain of the hearing device, like what can occur with wax buildup. Additionally or alternatively, dropping a device can cause damage that introduces non-linear distortions in the sound reproductions of the device.

A wax build-up on the tip of the receiver or on the microphone can lead to signal levels dropping significantly causing the user to have reduced or no amplification and hence defeating the purpose of the hearing devices. Similarly, damage to either of the transducers when accidently dropped could introduce higher non-linear distortions and undesirable audible components that impact the speech intelligibility and/or sound quality of the hearing devices. Traditional methods address these issues by providing a recommendation of cleaning the device with cloth or some sort of cleaning tool without knowing where and what the specific issue(s) is/are.

Methods for testing hearing aids have been developed in an effort to reduce the cost and complexity of previously known test facilities that require expensive equipment and isolated spaces such as a testing box or test room to operate in. U.S. Pat. No. 6,671,643 discloses a method of testing a hearing aid in which a sound channel having a predetermined acoustic transmission response is provided between an output transducer and a microphone of the hearing aid to test electrical test signals introduced into an interrupted signal path between the output transducer and the microphone, to evaluate the microphone signal of the hearing aid. This method requires the use of a computer and specialized test equipment that are operated in a professional testing environment.

U.S. Pat. No. 10,045,128 discloses a hearing device test system for users that allows calibration of a hearing device by partially inserting the hearing device into an acoustic calibration cavity of a portable test unit, wherein the system is designed to compare calibration data outputted by the hearing device with reference data to determine whether the hearing device is operating within acceptable levels of performance. If the hearing device is determined not to be operating within acceptable levels of performance, the system attempts to automatically recalibrate the hearing device and then testing is rerun to determine if the recalibration put the performance of the hearing device to within acceptable levels. The system is therefore concerned with the electronic performance of the hearing device and with recalibrating the electronic performance when it is not within acceptable standards. The system is not configured to identify or diagnose physical causes of degradation in performance, such as wax buildup or other obstructions. The system also does not perform specific testing or diagnostics for damage to components caused by shock or dropping.

Methods of self-testing hearing aid components are described in "Using DSP to Screen Hearing Aid Component Defect", The Hearing Review, February 2003. These methods are for use by dispensing professionals and require the hearing aid to be connected by cable to the same programming device that is used to program the hearing aid. Thus these methods are not available to the user, as the user is not skilled in programming a hearing aid and does not have access to the programming device.

It would be desirable to provide systems and methods to detect the clogging of the hearing device transducers to specifically identify whether a microphone is clogged (or partially clogged) as well as to specifically identify whether a receiver is clogged (or partially clogged), and to provide such systems and methods as to be affordable and accessible at the user level.

It would be desirable to provide systems and methods to detect whether damage to one or more of transducers of a hearing device has occurred, and to provide such systems and methods as to be affordable and accessible at the user level.

It would be desirable to provide systems and methods for providing specific recommendations to a user of a hearing device regarding cleaning a hearing device and which component or components to clean, replace or service.

It would be desirable to provide systems and methods to distinguish between whether cleaning of a hearing device is needed or replacement of a hearing device or one or components is needed, due to damage to one or more transducers, and to provide such systems and methods as to be affordable and accessible at the user level.

SUMMARY OF THE INVENTION

According to an aspect of the present invention, a system for detecting and diagnosing causes of subpar performance of a hearing device includes: the hearing device having a housing, a receiver and a sound processor configured to send signals to the receiver, the receiver configured to output audio signals from the signals sent by the sound processor; a base unit including a main body having a cradle formed therein, the cradle configured to receive the hearing device therein, and a base unit microphone interfacing with the cradle and configured to receive the output audio signals from the receiver when the hearing device is received in the cradle, wherein the base unit microphone and the receiver remain in open communication with a space exterior of the base unit when the hearing device has been received in the cradle; and a processor associated with the system and configured to compare signal energy levels of test audio signals produced by the base unit microphone, in response to the audio signals received from the receiver, with signal energy levels of reference audio signals, and to indicate a blockage of the receiver has occurred when a difference between the signal energy levels of test audio signals and the signal energy levels of reference audio signals exceeds a threshold difference.

In at least one embodiment, the system further includes a lid configured to be placed over the main body, the cradle and the hearing device, to maintain the space exterior of the base unit, but to close off the space and hearing device from acoustic signals external of the lid and the main body, while the base unit microphone and the receiver remain in open communication with the space.

In at least one embodiment, the system is configured to notify and recommend a user of the system to clean the receiver or a filter, or replace the filter through which the receiver outputs the audio signals when the difference between the test audio signals and the reference audio signals exceeds the threshold difference.

In at least one embodiment, the base unit is configured to charge the hearing device when the hearing device is received in the cradle.

In at least one embodiment, the cradle of the main body is configured to at least partially receive two of the hearing devices therein.

In at least one embodiment, a second base unit microphone interfaces with the cradle and is configured to receive second output audio signals from a second receiver of a second of the two hearing devices, when the second hearing device is received in the cradle.

In at least one embodiment, first and second hearing devices are provided, wherein the first hearing device further includes a first microphone configured to send first input audio signals to the sound processor of the first hearing device; the second hearing device includes a second housing, a second receiver, a second sound processor configured to send second signals to the second receiver, the second receiver configured to output second audio signals, and a second microphone configured to send second input audio signals to the second sound processor. The system is configured to control at least one of the first and second hearing devices to output at least one of the first and second audio signals, wherein the first microphone receives the at least one of the output first and second audio signals and generates the first input audio signals therefrom; and wherein the processor is configured to compare signal energy levels of the first input audio signals with signal energy levels of the at least one of the output first and second audio signals, and to indicate a blockage of the first microphone has occurred when a difference between the signal energy levels of the first input audio signals and the signal energy levels of the at least one of the output first and second audio signals exceeds a predetermined microphone threshold difference.

In at least one embodiment, the processor configured to compare signal energy levels of the first input audio signals with signal energy levels of the at least one of the output first and second audio signals comprises the sound processor of the first hearing device.

In at least one embodiment, the processor configured to compare signal energy levels of the first input audio signals with signal energy levels of the at least one of the output first and second audio signals comprises a processor located in the base unit.

In at least one embodiment, the system further includes a computing device, wherein the computing device is configured to be communicatively coupled to at least one of the base unit and the hearing devices; and wherein the processor configured to compare signal energy levels of the first input audio signals with signal energy levels of the at least one of the output first and second audio signals comprises a processor located in the computing device.

In at least one embodiment, the system is configured to notify and recommend a user of the system to clean the first microphone or a first microphone wax filter, or replace the microphone wax filter through which sound passes to reach the first microphone, when the difference between the signal energy levels of the first input audio signals and the signal energy levels of the at least one of the output first and second audio signals exceeds the predetermined microphone threshold difference.

In at least one embodiment, the base unit is configured to charge the first and second hearing devices when the first and second hearing devices are received in the cradle.

In at least one embodiment, the system further includes a computing device, wherein the computing device is configured to be communicatively coupled to at least one of the base unit and the hearing device to execute a detecting and diagnosing application.

In at least one embodiment, the computing device comprises a smart phone, tablet or personal computer (PC).

In at least one embodiment, the computing device is configured to communicatively couple to at least one of the base unit and the hearing device via Bluetooth communication.

In an aspect of the present invention, a system for detecting and diagnosing causes of subpar performance of a hearing device includes: the hearing device having a housing, a receiver and a sound processor configured to send audio signals to the receiver, the receiver configured to output audio signals; a base unit comprising a main body having a cradle formed therein, the cradle configured to receive the hearing device therein, and a base unit microphone interfacing with the cradle and configured to receive the output audio signals from the receiver when the hearing device is received in the cradle, wherein the base unit microphone and the receiver remain in open communication with each other via a space exterior of the base unit when the hearing device has been received in the cradle; and a processor associated with the system and configured to calculate at least one measure of distortion of the audio signals received from the receiver and sent to the processor via the base unit microphone, and to indicate receiver damage when at least one of the at least one measure exceeds at least one distortion threshold.

In at least one embodiment, the system includes a lid configured to close off the base unit and the cradle, while maintaining the space exterior of the base unit beneath the lid.

In at least one embodiment, the at least one measure of distortion comprises at least one of total harmonic distortion or difference frequency distortion and the at least one distortion threshold comprises at least one of a total harmonic distortion threshold or a difference frequency distortion threshold.

In at least one embodiment, the system is configured to notify a user of the system that the receiver is damaged when at least one of the at least one measure exceeds at least one respective distortion threshold.

In at least one embodiment, prior to the calculation of the at least one measure of distortion, the processor is configured to compare signal energy levels of test audio signals produced by the base unit microphone, in response to the audio signals received from the receiver, with signal energy levels of reference audio signals, and to indicate a blockage of the receiver has occurred when a difference between the signal energy levels of test audio signals and the signal energy levels of reference audio signals exceeds a threshold difference; and wherein the processor calculates the at least one measure of distortion when a difference between the signal energy levels of test audio signals and the signal energy levels of reference audio signals does not exceed the threshold difference.

In an aspect of the present invention, a method of detecting and diagnosing causes of subpar performance of a hearing device includes: outputting audio signals from a receiver of a hearing device placed in a cradle of a base unit;

receiving the audio signals by a base unit microphone in the cradle of the base unit and producing test audio signals; comparing signal energy levels of the test audio signals with signal energy levels of reference audio signals; and indicating that a blockage of the receiver has occurred when a difference between the signal energy levels of test audio signals and the signal energy levels of reference audio signals exceeds a threshold difference.

In at least one embodiment, the method further includes notifying a user and recommending cleaning the receiver or a filter, or replacing the filter through which the receiver outputs the audio signals when the difference between the signal energy levels of test audio signals and the signal energy levels of reference audio signals exceeds the threshold difference.

In at least one embodiment, the method further includes charging the hearing device received in the cradle with the base unit.

In at least one embodiment, the method further includes calculating at least one measure of distortion of audio signals outputted by the base unit microphone in response to audio signals received from the receiver; and indicating receiver damage when at least one of the at least one measure exceeds at least one distortion threshold.

In at least one embodiment, the method further includes notifying a user of receiver damage and recommending replacement of the receiver or hearing device when the at least one of the at least one measure exceeds the at least one distortion threshold.

In at least one embodiment, the method further includes receiving test microphone audio signals by a microphone of the hearing device; processing microphone audio signals outputted by the microphone in response to receiving the test microphone audio signals to compare signal energy levels of the test microphone audio signals with signal energy levels of the microphone audio signals; and indicating that a blockage of the microphone has occurred when a difference between one or more of the signal energy levels of the test microphone audio signals and the signal energy levels of the microphone audio signals exceeds a microphone threshold difference.

In at least one embodiment, the test microphone audio signals are outputted by the receiver of the hearing device.

In at least one embodiment, two hearing devices are placed in the cradle of the base unit, the hearing device is a first hearing device and a second of the two hearing devices is a second hearing device; and the test audio signals are outputted by a receiver of the second hearing device.

In at least one embodiment, two hearing devices are placed in the cradle of the base unit, the hearing device is a first hearing device and a second of the two hearing devices is a second hearing device; wherein the test audio signals are outputted by a receiver of the second hearing device and the receiver of the first hearing device.

In at least one embodiment, the method further includes notifying a user and recommending cleaning the microphone or a microphone filter, or replacing the microphone filter through which the sound passes into the microphone, when the difference between one or more of the signal energy levels of the test microphone audio signals and the signal energy levels of the microphone audio signals exceeds the microphone threshold difference.

These and other advantages and features of the invention will become apparent to those persons skilled in the art upon reading the details of the systems, devices and methods as more fully described below.

BRIEF DESCRIPTION OF THE DRAWINGS

At least one preferred embodiment of the present invention is shown and described herein. The present invention may include further different embodiments, the details of which may be modified in various, obvious aspects without departing from the scope of the invention. Accordingly, the drawings and descriptions will be regarded as illustrative in nature and not as restrictive.

DETAILED DESCRIPTION OF THE INVENTION

Figure 1:
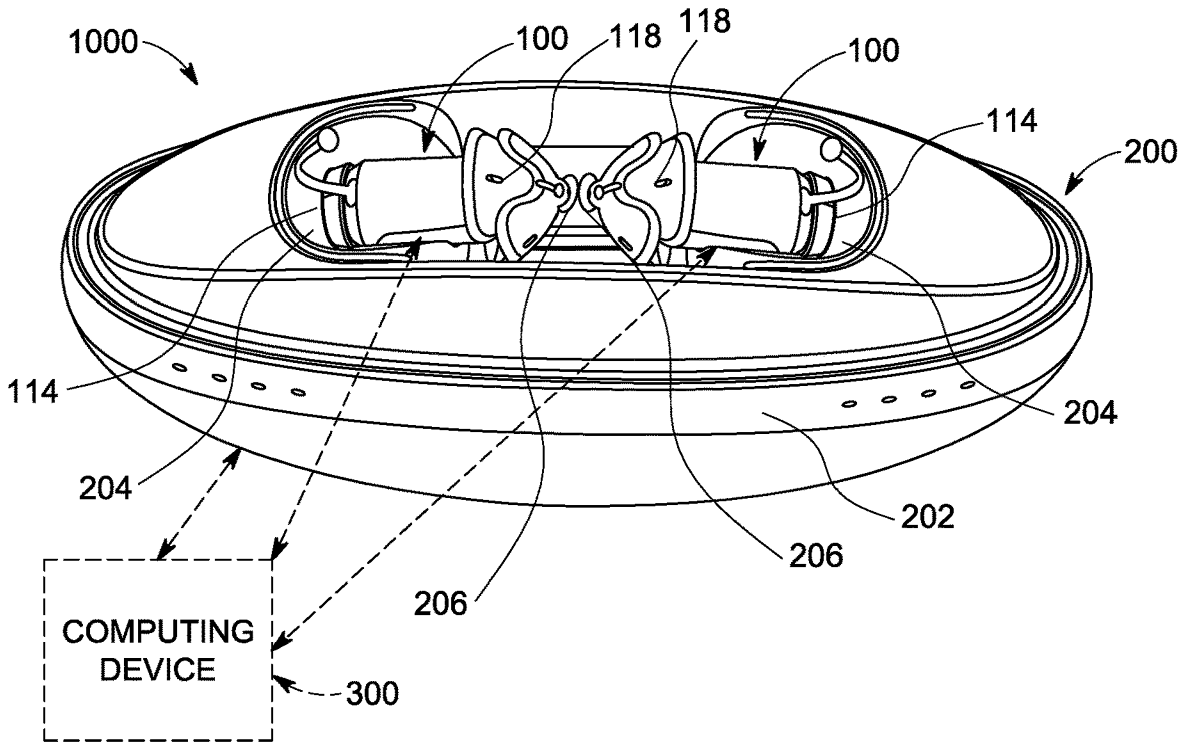
FIG. 1 illustrates a system for detecting and diagnosing causes of subpar performance of a hearing device, according to an embodiment of the present invention.

Before the present systems, apparatus and methods are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein, in their entireties, by reference thereto, to disclose and describe the methods and/or apparatus in connection with which the publications are cited.

It must be noted that as used herein and in the appended claims, the singular forms “a”, “an”, and “the” include plural referents unless the context clearly dictates otherwise. Thus, for example, reference to “a speaker” includes a plurality of such speakers and reference to “the hearing device” includes reference to one or more hearing devices and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

“Open communication” or “open acoustic communication”, as used herein, refer to audio devices such as a receiver and a microphone having unrestricted space between them so that audio signals can travel freely therebetween. Open communication does not include channeling an audio signal through a tube or vent, for example. Open communication is allowed between components of a hearing device, or between those components and a microphone of a base unit when they are not sealed off or blocked from one another, but allow audio signals to freely travel therebetween. For example, when hearing devices have been placed/received in a cradle of a base unit, as described herein, the space above the hearing devices (whether covered by a lid or not) remains as open space between the receivers and microphones (of the base unit, as well as hearing devices that have microphone) so that open acoustic pathways exist therebetween.

FIG. 1 illustrates a system 1000 for detecting and diagnosing causes of subpar performance of a hearing device, according to an embodiment of the present invention. System 1000 includes a base unit 200, at least one hearing device 100, and optionally, a computing device 300 such as a smartphone, tablet, personal computer (PC) such as a laptop computer, desktop computer or the like that is configured to communicate with at least one of the base unit 200 and hearing device 100. In the embodiment shown in FIG. 1, two hearing devices 100 in the form of hearing aids are shown placed in the cradle 204 of the base unit 200. Alternatively, only one hearing aid 100 may be placed in cradle 204 of a system 1000 according to an embodiment of the present invention. However, it is typically more practical and efficient to process a pair of hearing devices and therefore the preferred embodiment includes two hearing devices 100.

The hearing device 100 may be a hearing aid such as a completely-in-the-canal (CIC) hearing aid as shown, a behind the ear (BTE) hearing aid, a mini BTE hearing aid, an in the ear (ITE) hearing aid, or an in the canal (ITC) hearing aid or other type of hearing aid, a personal sound amplification device, or other device having a receiver (or speaker) and sound processor wherein the device is configured to provide audio signals into the ear of a user. Provided herein are methods for diagnosing specific problems with receivers and speakers of hearing devices. However, if a hearing device being tested does not have a speaker, then the present inventive tests for specific problems with receivers could still be executed.

Figure 2:
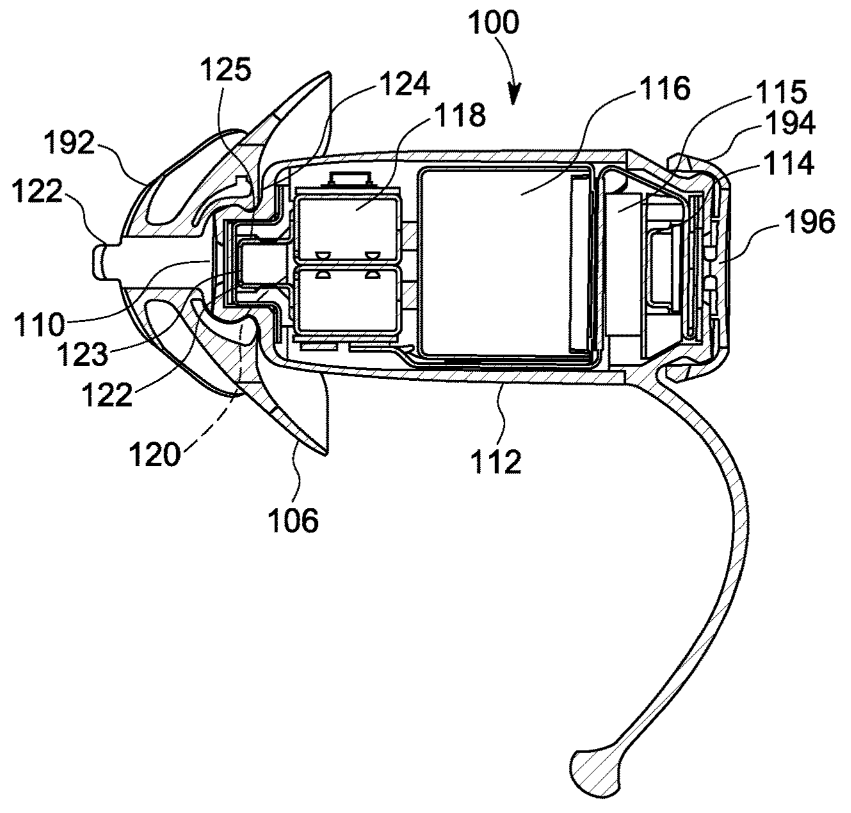
FIG. 2 is a longitudinal sectional view of a hearing device that can be a component of a system according to an embodiment of the present invention.

FIG. 2 is a longitudinal sectional view of a hearing device 100 that is shown here for reference to and description of the various components that can be tested and diagnosed according to an embodiment of the present invention. Hearing device 100 includes a housing or shell 112 which may house electronic components and provides a structure to which guards 192, 194 may be attachable and removable. Electronic components that may be housed by the shell/housing 12 may include, without limitation, a microphone 114, a battery 116, a receiver 118, which may include a sound processor 115, and/or an actuator. The battery 116 or any other energy storage system may provide power to the other electronic components. The microphone 114 may receive and/or collect sound. The sound processor may be used for sound amplification and amplified sound is outputted from the receiver 118. The actuator may be used for sound transmission to a passive amplifier. In the embodiment shown in FIG. 2, the receiver 118 is contained within the distal end portion of the housing/shell 112 and the central portion of the housing/shell 112 may house a sound processor. The microphone 114 opens through the proximal end of the housing/shell 112. In the embodiment of FIG. 2, shell 112 is substantially cylindrically-shaped, but tapers to a relatively smaller diameter at the distal end portion so as to be generally "bullet-shaped", although other shapes, such as cylindrical or other configuration could be substituted, such as an elongate body having a bend so that it is not straight along its longitudinal axis. A receiver filter 120 may optionally be provided within the shell/housing 112 between the distal end of the shell/housing and the receiver 118, so as to provide an additional level of protection against moisture and/or wax reaching the receiver 118, as well as to provide dirt, dust and debris protection, and visually cover up the receiver port to improve aesthetics. The filter 120 may be made of PET monofilaments woven into a mesh pattern, covered in a hydrophobic coating, which is then laminated with pressure sensitive adhesive (PSA) on either side and stuck to a shell/dampener during assembly. In one specific embodiment the pores of the filter may comprise 19 um squares, but this may vary depending on acoustic performance desired. A metal mesh (e.g., woven, stamped, etched and/or/drilled, etc.) could be used in lieu of plastic mesh. A membrane-style filter made of expanded polytetrafluoroethylene (ePTFE) could also be used in lieu of a mesh.

The shell/housing 112 further comprises a distal tip 122 that extends distally of the distal surface 124 of the shell 112. The distal tip 122 includes one or more openings 123 that allow air flow/sound to pass therethrough. The distal tip 122 is configured to mate with a mating connector 125 of the guard 122. The guard 122 may include a filter 110 which may be located on a distal face of the base 122 or inset therefrom as shown in FIG. 2. Filter 110 is configured to allow air flow/sound therethrough, while discouraging the inflow of wax and moisture, providing a level of protection of the receiver 118 from wax or other debris buildup and/or occlusion. Outwardly extending members 106 extend from a base of the guard 120 and are configured to function as a securing mechanism for securing the hearing aid in the ear canal.

The guard 194 may include one or more filters 196 configured to allow air flow/sound therethrough, while discouraging the inflow of wax and moisture, thereby providing a level of protection to the microphone 114 from wax or other debris buildup and/or signal attenuation. Both guard 194 and clip tip 192 are hand removable in the embodiment of FIG. 2, to allow a user to easily remove them by hand, without the need for tools, and replace them with new versions, or clean them and replace the original, though cleaned guards on the hearing aid. Further details about these configurations can be found in U.S. Pat. No. 10,835,931, which is hereby incorporated herein, in its entirety, by reference thereto. However, the present invention is, of course, not limited to hearing devices that have removable guards of the type described here, as alternative hearing devices may be tested, such as those in which filters can be removed separately from other components of the device. Even hearing devices having no filters or having filters that cannot be easily removed could be tested according to embodiment of the present invention, as a blockage could still be diagnosed relative to a receiver or a microphone and potentially these components could be cleaned in response to finding clogging. Likewise a receiver damage test can be performed on a hearing device having a receiver, regardless of whether a filter is provided for protecting the receiver from wax buildup.

Figure 3:
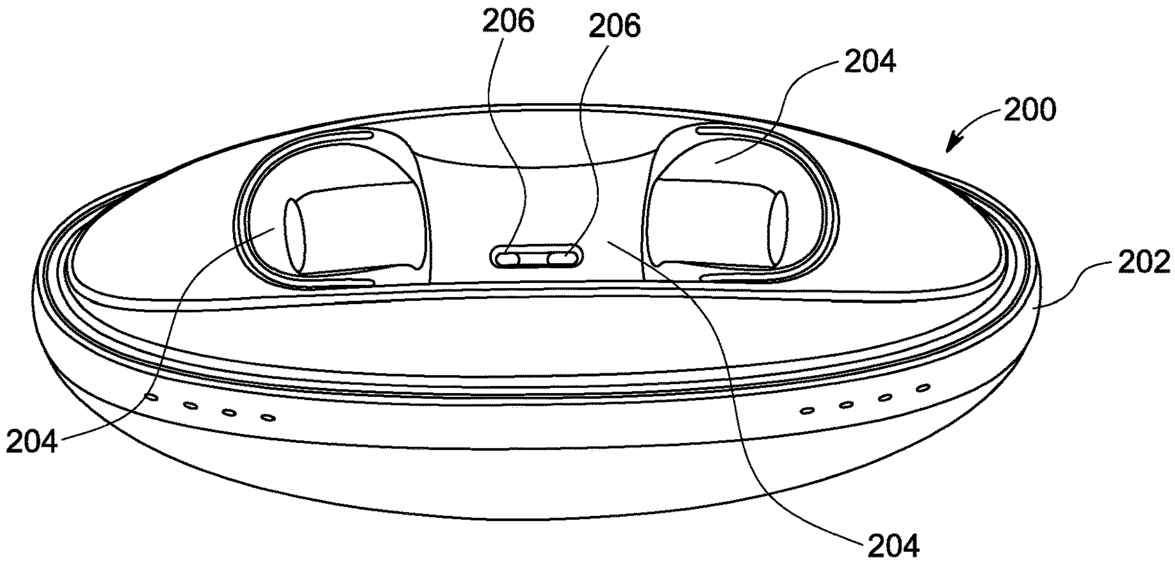
FIG. 3 is a top perspective view of a base unit according to an embodiment of the present invention.
Figure 4:
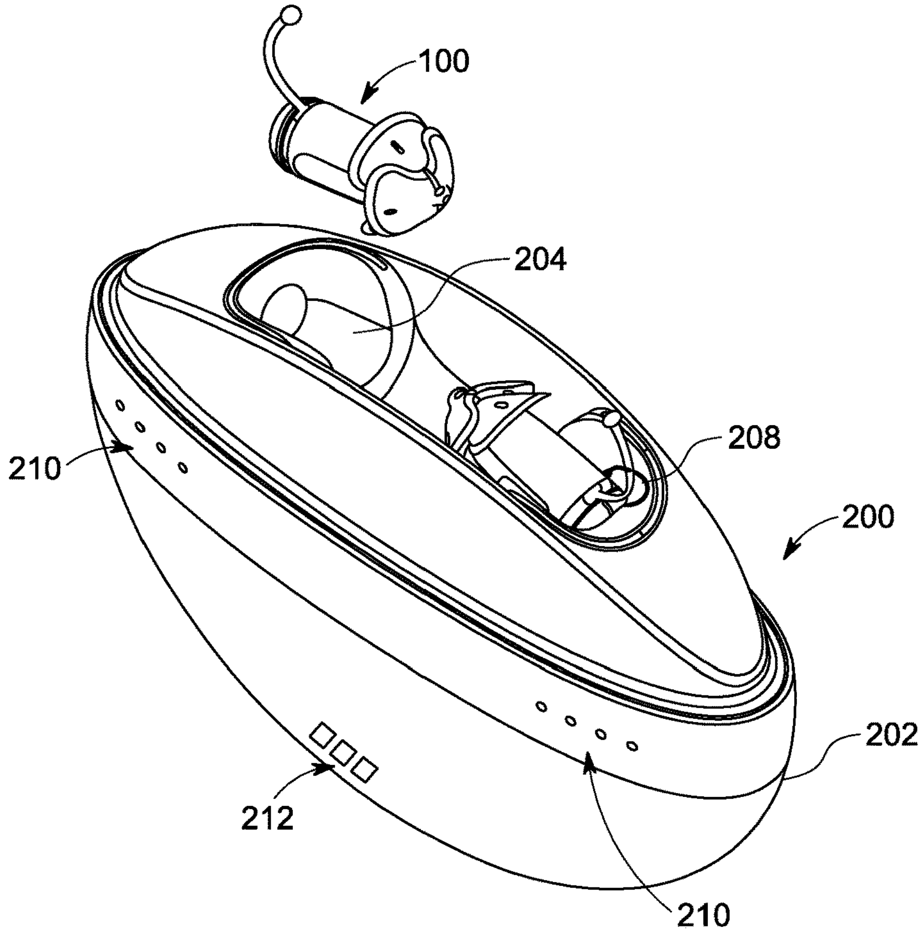
FIG. 4 is a perspective view of a base unit showing one hearing device having been received in the cradle, and a second hearing device positioned above the base unit, ready to be placed/received in the cradle, according to an embodiment of the present invention.

FIG. 3 is a top perspective view of a base unit 200 according to an embodiment of the present invention. Base unit 200 includes a main body 202 and a cradle 204 extending into the main body 202 that is configured and dimensioned to receive at least one hearing device 100 therein. Preferably cradle 204 is configured and dimensioned to receive two hearing devices 100 therein, such as shown in FIG. 1. FIG. 4 is a perspective view of base unit showing one hearing device 100 having been received in cradle 204 and a second hearing device positioned above the base unit, ready to be placed/received in the cradle 204. When received/placed within the cradle 204, the hearing device(s) 100 and cradle 204 remain open to the space external of the base unit 200, as shown in FIG. 1.

A base unit microphone 206 is provided in the base unit 200 and interfaces with the cradle 204 in a location configured to be in close proximity with a receiver 118 when hearing device 100 is placed in the cradle 204 like shown in FIG. 1. Base unit microphone 206 may be provided at the bottom of the cradle 204 or on a side wall thereof, in alignment with or in close proximity to the receiver 118 of the hearing device 100 when placed in the cradle 204. In the embodiment shown in FIG. 3, base unit 200 includes two base unit microphones 206 placed and configured to be in audible communication with respective receivers 118 of the two hearing devices 100. As shown in FIG. 1, the base unit microphone 206 and receiver 118, as well as microphone 114 remain in open communication (open acoustic communication) with each other and with a space exterior of the base unit 204 when the hearing devices 100 have been placed/received in the cradle 204. That is, the cradle 204 remains open as the recess formed by the cradle 204 that receives the hearing device(s) 100 does not seal off all or any part of the hearing device(s) 100. In this way open acoustic pathways exist between the receiver 118 and microphone 114. It is noted that even if a cover or lid is placed over the top of the base unit 202, the open communication remains in the space inside the lid/cover, so that there is still open communication between the receivers 118 and microphones 114 of the hearing devices 100.

In a preferred embodiment base unit 200 also functions as a charger for charging the batteries of the hearing devices 100. This consolidates the functions of charging and testing and diagnostics, thereby eliminating the need of providing an additional apparatus to perform the testing and diagnostics as a standalone unit. This embodiment therefor consolidates equipment, providing the user with space savings and potentially less cost as a single unit can be purchased for both charging and testing/diagnosis. Charging of the hearing device(s) 100 can occur concurrently with or separately from any of the testing and diagnosis procedures. Charging may be initiated automatically upon the placement/docking a hearing device 100 in the cradle 204, or can alternatively be programmed or manually started at a different time. For example, initiation of the diagnostic tests could begin at some predetermined time after beginning of charging, such as 30 minutes, or any other predetermined time period. Optionally, the predetermined time period could be programmable by the user. The base unit 200 may perform charging simultaneously with one or more diagnostic tests, or may be programmed to pause charging while a diagnostic test is being run.

Contacts 208 may be provided in cradle 204 and placed and dimensioned so that contacts 108 of hearing device 100 make contact with contacts 208 when the hearing device 100 is placed, docked in contact with the opposing contacts 208. Thus an electrical circuit is closed to enable charging of the battery of the hearing device 100.

The base unit 200 may be battery powered or use a plug-in AC power source, but is preferably battery powered, to make it more convenient for portability. The battery of the base unit 200 may be rechargeable, through a recharging base (not shown) or plug in to an AC power source. Charge indicators 210 (see FIG. 4) such as LED's or other visible indicators may be provided on the exterior of the main body 202 to readily display the charge levels of the devices being charged. A charge level indicator 212 may further be provided on the exterior of the main body to visibly display the charge level of the charger 200.

Figure 5:
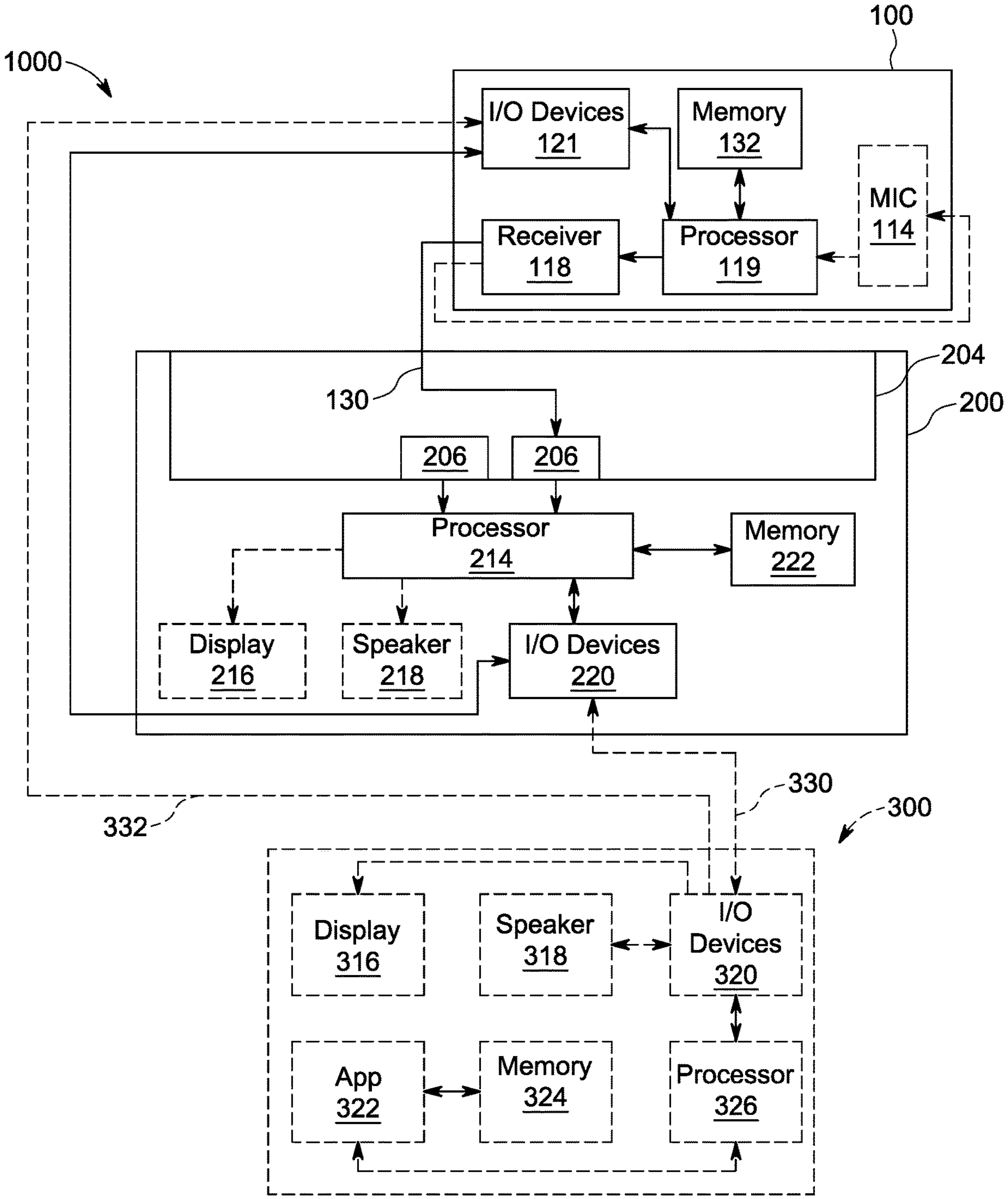
FIG. 5 is a block diagram that schematically illustrates components of a system according to embodiments of the present invention.

FIG. 5 is a block diagram that schematically illustrates components of system 1000 according to embodiments of the present invention. The base unit 200 may include one or more base unit microphones 206 interfacing with cradle 204 and electrically connected to processor 214. Processor 214 may be configured to process inputted audio signals to perform one or more of the detection and diagnosis procedures described herein and to optionally output results of such procedures to a display 216 and/or audible results output through a speaker 218, one or both of which may optionally be provided on the main body 202 of base unit 200. Additionally processor 214 or a separate processor (not shown) may be configured to process and execute charging functions of the base unit 200 in preferred embodiments where the base unit 200 functions as a hearing device charger. In embodiments where a computing device 300 is used, results may be outputted to display 316 and/or audible results output through a speaker 318. Still further, output can be provided to both the base unit 200 and the computing device 300. In any case, communication of the results may be carried out through I/O devices 220 (and optionally 320) by Bluetooth low energy (BLE) communication, wired, ultrasonic or Wi-Fi communication or alternatives. Memory 222 may store reference audio signals or reference data such as signal energy levels of reference audio signals to be used for comparison with test audio signals or signal energy levels of test audio signals when running diagnosis procedures, and may include one or more applications that can be run by processor 214 when executing diagnosis procedures. For example, the signal energy level of each frequency of tone included in a sweeping tonal test signal may be stored to be used for the comparisons. Alternatively, reference audio signals and/or applications could be accessed remotely via I/O device, such as from cloud storage or another external device. Further alternatively, when a computing device 300 is used, an app 322 may be executed by the computing device 300 to instruct base unit 200 to initiate a diagnostic test. Signals from microphones 206 may alternatively be communicated by processor 214 and I/O device 220 to computing device 300 to be processed by processor 326. Raw audio data may be stored in memory 324, or received from base unit 200 or other external source, such as the cloud or another local external device.

Hearing device 100 includes a receiver 118 configured to output sound (i.e., audio signals) which, when hearing device 100 is placed or received in cradle 204 can be picked up by microphone 206 for further processing. Hearing device 100 further includes a processor 119 which may be a sound processor or a processor that includes sound processing capability, or a sound processor and additional processor(s). Optionally the hearing device 100 includes a microphone 114 configured to receive ambient sounds, process them and send them to processor 119 for sound processing and input to receiver 118 which then outputs sound (audio signals). In preferred embodiments, such as hearing aids, hearing device 100 includes a microphone 114. One of the ways in which hearing device 100 may communicate with base unit 200 is by sound transmission from receiver 118 to base unit microphone 206. Additionally, hearing device 100 may be provided with one or more I/O devices 121 configured to enable communication (one or two-way) with base unit 200 via I/O device(s) 220. Communication may be carried out using Bluetooth low energy (BLE) communication, ultrasonic, Wi-Fi, ultra-wide band (UWB) communication or alternatives. Optionally, system 1000 may be configured so that direct communications between computing device 300 and hearing device 100 can be carried out between I/O devices 320 and 121.

Hearing device 100 may further include memory 132 that may store data such as executable instructions for predetermined sweeping tones to be executed by processor 119 and outputted by 118 when instructed. Memory 132 may include test signal instructions and programs to be executed by processor 119. For example, a program may be stored in memory 132 for calculating energy levels of an audio signal forwarded to a processor by microphone 114 in response to an audio signal captured by the microphone, and comparing the calculated energy levels with reference energy levels stored in memory that are representative of the energy levels of the audio signal captured by the microphone.

Figure 6:
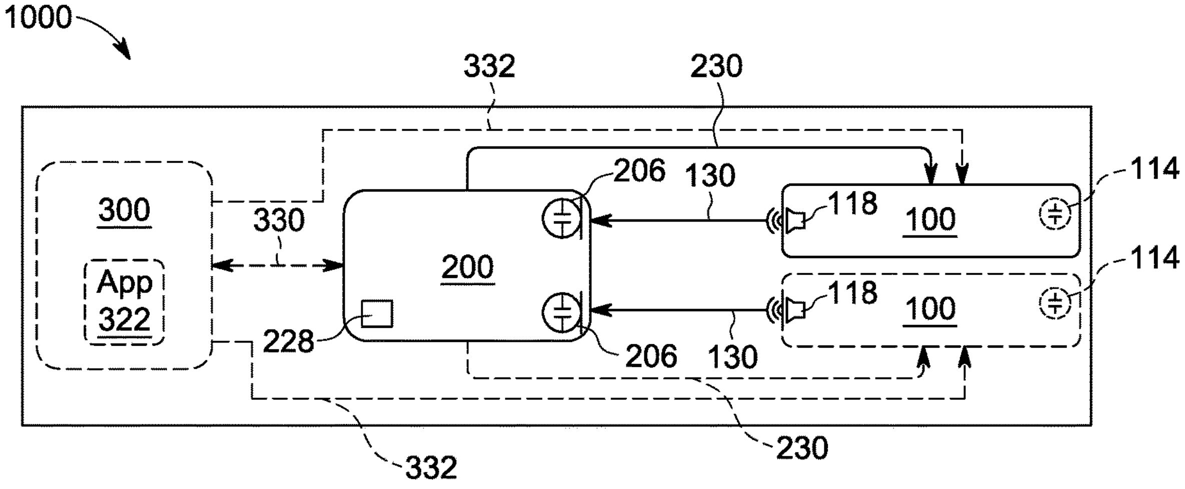
FIG. 6 shows a block diagram of a system illustrating various features that may be employed for executing a procedure to detect and diagnose causes of subpar performance of a hearing device, according to embodiments of the present invention.

FIG. 6 shows a block diagram of system 1000 illustrating various features that may be employed for executing a procedure to detect and diagnose causes of subpar performance of a hearing device, according to embodiments of the present invention. FIG. 6 is provided for reference in particular to testing that can be executed to detect and diagnose causes of subpar performance from the receiver 118 of the hearing device.

As noted, receiver clogging is a major cause of user complaints of reduced/no amplification from a hearing device. By providing system 1000, a method of detecting clogging/blockage can be executed and the system can notify the user to clean the receiver 118 and/or clean or change a wax filter or tip component that includes a wax filter. In an embodiment, a clip tip may be provided as in FIG. 2, for example, wherein outwardly extending members 106 and one or more filters are integrated into a clip tip that can be easily removed and replaced by a user, without the need for any tools, such as described in U.S. Pat. No. 10,835,931 and U.S. Patent Application Publication No. 2019/0110928A1, both of which are incorporated herein, in their entireties, by reference thereto. The clogging detection method can then be re-executed on the hearing device 100 to see if the changes made have improved the status of the hearing device 100 such that the receiver 118 is no longer being considered as clogged by the detection method. This testing and maintenance can have a significant impact on a continued improved listening experience to the user; and can lessen incidents of reduced amplification as well as less risk of hearing devices getting damaged to a point of complete failure. As methods of detecting and diagnosis, as well as simple cleaning and or tip/filter replacement procedures can be carried out by the user with the aid of the inventive system, they can also significantly reduce the number of returns of hearing devices to a professional or the manufacturer, as many instances can be resolved at the user end, leading to reduced overall expenses of the hearing devices, and less inconvenience to the user as the user will less often need to send in one or more hearing devices.

In some embodiments, where a computing device 300 is used in the system 1000, an app 322 may be executed on the computing device to initiate the detection method. In one non-limiting example, the user may initiate a hearing device receiver clogging test on the app 322. The computing device 300, via the app 322 sends a command over the communication channel 330 to the base unit 200, e.g. via BLE communication or any of the alternative communication types discussed above. The base unit 200 relays the command to the hearing device(s) 100 placed in the cradle 204 leveraging a communication protocol 230, such as a proprietary charger communication protocol (ECC), a Bluetooth low energy (BLE) communication, a wired or ultrasonic communication, a communication over W-Fi, or the like. Alternatively, the computing device 300 may send a test initiation command directly to the hearing device 100 via communication 332 using any of the communication modalities already described above. Communication via 332 may be performed simultaneously with communication via 330 to base unit 200. Alternatively, communication may be made through 332 in lieu of communication via 330 and hearing instrument 100 may initiate the test on the base unit 200 via acoustic instructions transmitted over acoustic path 130 leading from receiver 118 to base unit microphone 206. That is, communication may alternatively be made through 332 in lieu of communication via 330 and hearing instrument 100 may initiate the test on the base unit 200 per instructions received over 332. On initiation of the test; the tones are played from the receiver 118 and picked up acoustically by microphone 206. Further alternatively, base unit 200 can be configured to automatically self-initiate the receiver clogging test upon docking the hearing device 100 in the cradle 204 as part of a self-diagnostic check. Still further alternatively, the base unit 200 may be configured so that the user can press a button or otherwise initiate an actuator 228 on the base unit 200 to initiate a receiver clogging test.

In executing the receiver clogging test, the hearing instrument executes instructions to output frequency sweeping tones through the receiver 118. For testing hearing devices 100 that include a microphone 114, transmission of audio signals from the microphone 114 to the processor 119 or processing of signals received from the microphone 114 by the processor may optionally be temporarily disabled during the test to prevent additive feedback signals from being processed and outputted with the frequency sweeping tones. The frequency sweeping tones may be predefined tones at predefined frequencies played sequentially for predefined periods each. For example, predefined tones of 100, 200, 300, 400, . . . , 4800, 4900 and 5000 Hz may each be outputted for a period of 100 msec each, or each within a predefined time within the range of 50 msec to 1 sec. However, it is noted, that this is merely exemplary, as any frequencies may be used as the predefined tone frequencies, and each tone may be played for any predefined time period. Also, although each tone is typically played for the same length of time, this is not necessary, as predefined time periods could be different for one or more of the tone frequencies. Still further, multiple frequencies of tones may be outputted simultaneously. In each case, the acoustic transmission of the outputted tones is picked up by the microphone 206 in the base unit 200. The outputted tones received by microphone 206 are sent to processor 214 where they are compared as signal energy levels of digital test audio signals with signal energy levels of digital reference audio signals at respective frequencies, typically stored in memory 222, memory 324, or externally and accessible by system 1000. For example, this comparison may be performed by measuring/calculating the signal energy levels of the digital test audio signals and comparing the signal energy levels of the digital test audio signals with known/stored reference energy levels (signal energy levels of digital reference audio signals), representative of the digital reference audio signals, at the same respective frequencies as the digital test audio signals. In at least one embodiment, microphone 206 is a digital microphone and converts the analog signals of the tones picked up to the digital test audio signals that are sent to processor 214. Alternatively, if an analog microphone is used, a separate A/D component (or one integrated into the processor) can be provided for conversion from analog to digital. Alternatively, the digital test audio signals may be sent to processor 326 of computing device 300 for comparison with the reference audio signals/reference signal levels.

Figure 7:
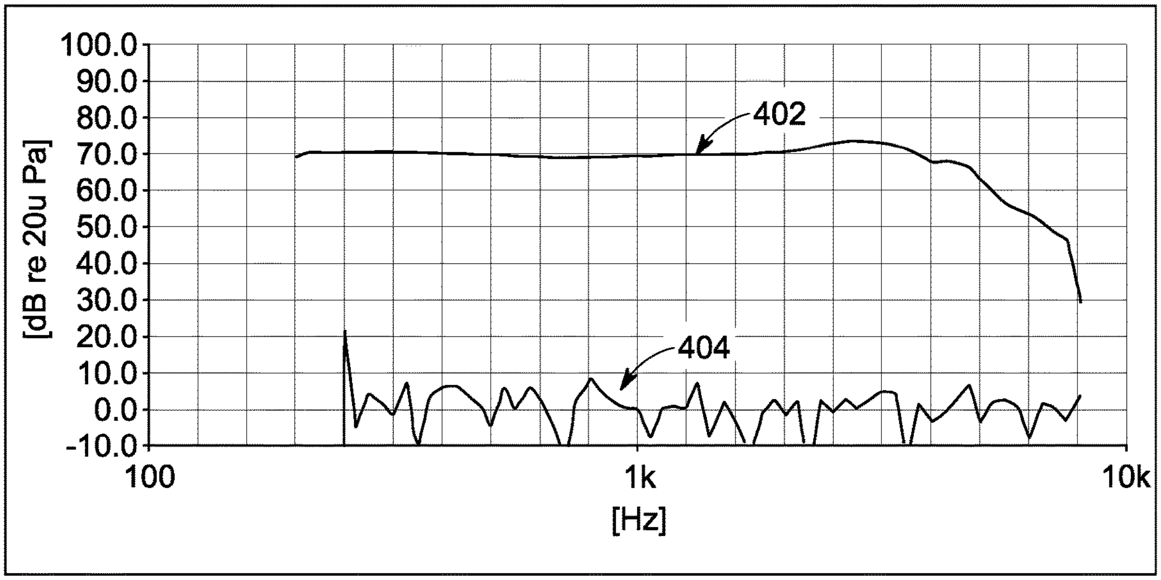
FIG. 7 plots the frequency response of audio signals outputted from a receiver of a hearing device in which there is no wax buildup or other blockage of the receiver, compared to the frequency response of audio signals outputted from the receiver of the hearing device after artificially clogging the receiver output port with test debris.

By comparing the output signal energy levels of the various frequencies of tones transmitted in the test audio signals to the signal energy levels of the reference signals at the same frequencies, detection of receiver blocking can be identified in instances where one or more frequencies of the test audio signal has a level that is significantly below the reference level at the same frequency(ies). Note that the reference audio signals have signal energy levels that are expected when no blockage is occurring at the receiver location. FIG. 7 plots the frequency response of audio signals 402 outputted from a receiver 118 of a hearing device 100 in which there is no wax buildup or other blockage of the receiver, compared to the frequency response of audio signals 404 outputted from the receiver 118 of the hearing device after artificially clogging the receiver 118 output port with test debris. The test debris used for artificially clogging the receiver 118 in the experiment for FIG. 7 was reusable and removable Poster Putty, by Duck brand.

The frequencies of the signals (in Hz) are plotted along the X-Axis and the energy levels of the signals (in dB) are plotted along the Y-axis. The signal measurement was performed in an anechoic test box with the hearing device 100 inserted into a 2 cc coupler. The signal outputted from the receiver 118 was picked up by a reference microphone. The frequency sweeping tones were played by an external test speaker.

The output of the signals from the external speaker having been processed to give the plot 402 can therefore be used as reference signals against which to compare test signals to detect and diagnose when blockage is occurring. In the signal 404 with the known blocking, it can be seen that the output levels are significantly less than the output levels of signal 402 across all frequencies. There is about a 40 to 50 dB difference between the signals in most frequencies, which clearly shows that there has been degradation of the output of receiver 118, and that this degradation could be due to clogging. In response to this finding, a user could then clean the receiver 118, clean or replace a wax filter through which the receiver 118 outputs, and/or replace a tip (clip tip) 122 that contains a wax filter, so that the replaced tip has a new and unobstructed wax filter, or other cleaning or replacement procedures that could readily be carried out at the user end. After this the receiver 118 can then be instructed to output test signals again and these test signals can be compared to the reference signals during further processing. If the test signals are within a predefined threshold of level difference from the reference signals, then it can be concluded that the cleaning and/or replacement procedures that the user carried out were successful, and that there is no longer currently a blockage problem. If the test signals are still not within threshold levels, then the user could attempt further cleaning and/or replacement procedures as noted and run the test again, or seek professional assistance in solving the problem. If the decision is made to try and do further cleaning and/or replacement, then another test signals is produced afterwards and compared to the reference signal to see if the receiver now passes the blockage detection test. Results of test comparisons can be sent to the computing device 300 and displayed and/or audibly output to the user. Alternatively or additionally, results can be displayed and/or audibly output through the base unit 200.

The threshold upon which is diagnosis of blockage is made is one or more predetermined values and may vary, but are typically fixed once the predetermined value(s) have been decided upon. For example, blockage may be determined when one or more tonal frequencies in the test signal is 10 dB, 15 dB, 20 dB, 25 dB or more, or any value in between these values, lower than the corresponding tonal frequency in the reference signal. Furthermore, these values are exemplary only, as other predetermined values could be substituted. However, the predetermined values set prior to making a comparison of a test audio signal to the reference audio signal. Optionally, the number of test frequencies that are outside of the threshold difference may be considered when deciding whether a blockage is to be diagnosed. For example, if only one tonal frequency is outside the threshold, then this may not be enough to trigger a diagnosis of potential blockage. Thus, 2, 3, 4 or more frequencies of test signals may need to be outside of the threshold levels before a determination is made that the receiver is potentially blocked. Further alternatively, different weights may be applied to different test frequencies, which are applied in a formula to calculate when a diagnosis of potential blockage is to be made. In these instances, frequencies in the normal range of human speech may be assigned higher weights than frequencies outside of the normal range of human speech, so that frequencies inside the normal range of human speech, when produced at levels below the threshold values, are more likely to result in a diagnosis of potential blockage. Further alternatively, the threshold deltas between the reference audio signals and the test audio signals may vary from frequency to frequency. As a non-limiting example, the threshold values for frequencies within the range of human speech may be closer to the reference values than the threshold values of frequencies outside the range of human speech.

It is not uncommon for hearing devices to be accidently dropped by users. Dropping of a hearing device 100 can cause damage to the transducer element of the receiver 118. Damage to the receiver 118 due to a drop may result in larger than normal non-linear distortions and undesirable audible components which are present in the output from the receiver 118 but not in the input to the receiver 118. When distortion occurs; a hearing device 100 produces undesired frequency components at the output from the receiver 118 through the interaction of the processed signal with an internal non-linear mechanism. The undesired frequency components may interfere to some degree with the reception of sound by the listener. If the undesired frequency components are relatively small in level compared to the overall signal level, they may be negligible to as to effectively cause no noticeable interference at all to the user. However, if the undesired frequency components are relatively large in level compared to the overall signal level, they can be so disruptive to the listener that the desired sound (desired frequencies without the undesired frequency components) becomes irritating or even incomprehensible due to the sounds produced by the undesired frequencies. Because hearing devices are typically provided and fitted to a user with a goal of restoring or facilitating communication ability, undistorted sound is important for optimum speech intelligibility and sound quality, and therefore providing the user with a capability to periodically test the receiver for any shock/drop damage can be very beneficial.

Although not absolutely necessary, it is preferred to execute a receiver clogging test prior to executing a receiver damage test, and to first resolve any issues of clogging or partial clogging that may exists. By doing so, this provides one less complicating factor that needs to be considered when executing to detect and diagnose whether any damage have been done to the receiver due to dropping or shock that would cause distortions in the receiver output. Additionally by doing so, this would provide cleaner signal levels of fundamental frequency component and harmonics.

Like a receiver clogging test, a receiver damage test may be initiated by execution of an app 322 on a computing device in a manner previously described. Alternatively; like a receiver clogging test, a receiver damage test can be self-initiated in the base unit 200 when the hearing device 100 is placed in the cradle 204, as part of self-diagnostic check, or can be done by connecting the base unit 200 with a computing device 300. Further alternatively, like a receiver clogging test, a receiver damage test can be initiated by manipulating an actuator on the base unit 200 after the hearing device 100 has been placed/received in the cradle 204. Such manipulation may include pressing a button on the base unit 200, a voice command to the base unit 200 (or computing device 300), or the like.

In the example where a user initiates a hearing device receiver damage check test on computing device 300 (such as by executing a command from app 322), a command is sent over BLE or other communication means (described above) to the base unit 200. Alternatively the command may be sent directly to the hearing device 100. When received by the base unit 200, the base unit relays the command to the hearing device 100 placed on the cradle 204 using a proprietary communication protocol, a Bluetooth low energy (BLE) communication, a wired or ultrasonic communication, Wi-Fi communication, or the like. Note that if two hearing devices 100 have been placed in the cradle 204 of the base unit 200, the communication from the computing device 300 to the base unit 200, or, alternatively the communication directly from the base unit 200, is specific as to which hearing device 100 is to execute the hearing device receiver damage check test, and is received and executed by such hearing device 100. The other hearing device can be subsequently tested by the same procedure, but by commands specific to that particular hearing device 100.

The hearing device 100 initiates the test by instructing the sound processor to execute frequency sweeping tones that are played out from the receiver 118. Like the receiver clogging test, for testing hearing devices 100 that include a microphone 114, transmission of audio signals from the microphone 114 to the processor 119 or processing of signals received from the microphone 114 by the processor may optionally be temporarily disabled during the test to prevent additive feedback signals from being processed and outputted with the frequency sweeping tones. The frequency sweeping tones may be the same as or different from those used in the receiver clogging test. It is further noted that, optionally, the frequency sweeping tones used as test audio signals in a receiver clogging test that results in a finding that no clogging is present may be used as the frequency sweeping tones for this receiver damage test. In either case, as noted above, the acoustic transmission of the frequency sweeping tones is picked up by the microphone 206 closest to the receiver 118 (alternatively, both microphones 206, or more, if provided, could be used). The post-processing of the tones played from the hearing device 118 and captured by microphone 206 can be done by processor 214, or the signals can be sent to processor 326 for post-processing. The results of the post processing, like those for a receiver clogging test, are displayed either by the computing device 300 or the base unit 200, or both, either visually, audibly, or both.

Receiver damage caused by shock/drop is typically manifested in the form of non-linear distortions. Examples of non-linear distortions that may occur from receiver damage and which may be tested for by the present invention include, but are not limited to total harmonic distortion (THD) and difference frequency distortion (DFD). Harmonic distortion occurs when a single frequency (typically called a fundamental frequency) is presented to the input of the hearing device and the output contains the fundamental frequency plus additional undesired frequencies that are harmonically related to the fundamental frequency.

Total Harmonic Distortion can be expressed in percentage as $$\% THD = 100\sqrt{(p_2^2+p_3^2+p_4^2+\ldots)/p_1^2} \quad (1)$$

where

THD is total harmonic distortion;

$p_1$=power of the fundamental frequency; and $p_2$, $p_3$ and $p_4$, etc. are the power of the $2^{nd}$, $3^{rd}$ and $4^{th}$ harmonics, etc., respectively.

Difference frequency distortion occurs when two frequencies (f1 & f2) are presented simultaneously to a hearing device and the output contains one or more frequencies that are related to the sum and/or the difference of the two input frequencies. Thus, DFD can result in the creation of many frequencies that occur across the frequency spectrum. For example, if the input frequencies are 1000 Hz and 1100 Hz; the output might contain added distortion at 100 Hz(f2−f1) and its subsequent harmonics. Additionally or alternatively, the output may contain distortions at 2100 Hz(f1+f2) and its harmonics. The third order distortion products 1200 Hz(2f2−f1) and 900 Hz(2f1−f2) are of most interest for hearing devices.

Computation of THD and/or DFD and/or other non-linear distortion calculations may be executed in the processor 214 and/or 326 liked described previously and display of results can be provided like results displays described previously. A result concluding with a receiver damage diagnosis may be found, for example, when % THD calculated exceeds a threshold % THD. For example, a % THD value less than 1% is considered to be normally operating and undamaged. A threshold % THD may be predetermined to be greater than 1%, greater than 2%, greater than 3%, greater than 4%, greater than 5%, greater than 6%, greater than 10%, greater than 12% or any value therebetween. When the calculated % THD exceeds the threshold % THD, the system outputs a resulting conclusion that the receiver is damaged and may recommend that the user send in or deliver the hearing device to a professional for further testing, repair and/or replacement. When the calculated % THD is less than the threshold % THD, the system outputs a resulting conclusion that the receiver is not damaged and that the user can continue using the hearing device with its current receiver.

A DFD threshold may be set as a value calculated by $$\% DFD = 100*\mathrm{sqrt}(2f2-f1)+(2f1-f2)/f1+f2+(2f2-f1)+(2f1-f2))$$

where

DFD is Difference Frequency distortion;

$f_1$ & f2=power of the fundamental frequencies; and

2f2−f1 and 2f1−f2=power of $3^{rd}$ order distortion products.

A result concluding with a receiver damage diagnosis may be found, for example, when % DFD calculated exceeds a threshold % DFD. For example, a % DFD value less than 1% is considered to be normally operating and undamaged. A threshold % DFD may be predetermined to be greater than 1%, greater than 2%, greater than 3%, greater than 4%, greater than 5%, greater than 6%, greater than 10%, greater than 12% or any value therebetween. When the calculated % DFD exceeds the threshold % DFD, the system outputs a resulting conclusion that the receiver is damaged and may recommend that the user send in or deliver the hearing device to a professional for further testing, repair and/or replacement. When the calculated % DFD is less than the threshold % DFD, the system outputs a resulting conclusion that the receiver is not damaged and that the user can continue using the hearing device with its current receiver.

Figure 8:
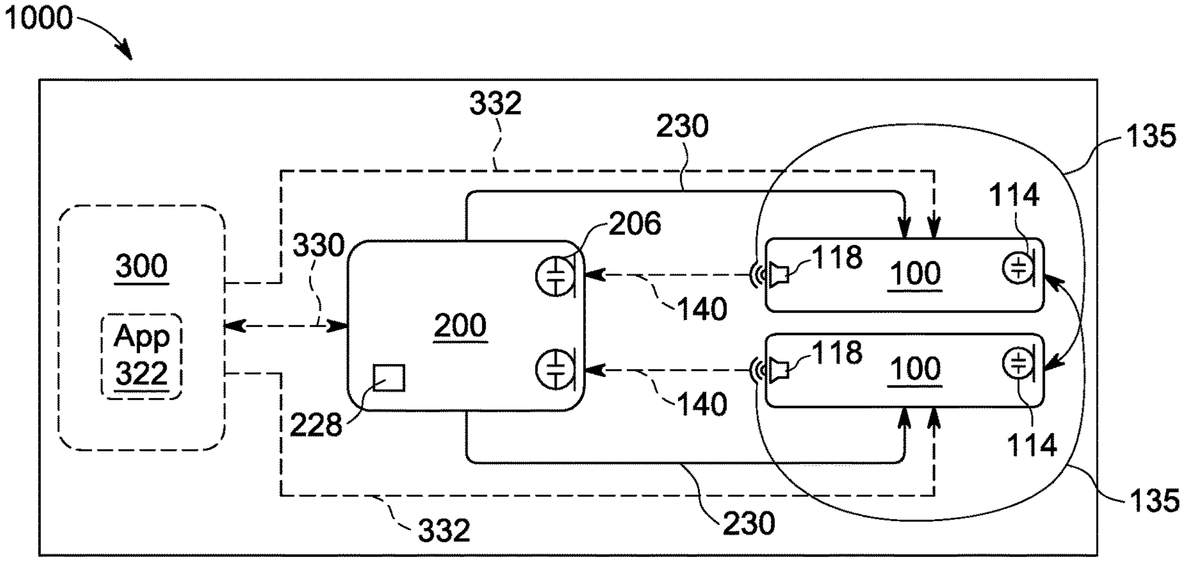
FIG. 8 shows a block diagram of a system illustrating various features that may be employed for executing a procedure to detect and diagnose causes of subpar performance of a hearing device, according to embodiments of the present invention.

Hearing devices 100 that include a microphone 114 are not limited to degradation in performance from clogging of the receiver 118 or receiver screen due to wax buildup or other obstruction/debris, as wax buildup or other obstruction/debris may also cause clogging or partial clogging the microphone to an extent to cause an unacceptable decrease in a level of audio signal outputted by the hearing device 100. Just like receiver 118 clogging from wax or other foreign elements; microphone 114 clogging is also a major cause of hearing device failures with users complaining of reduced/no amplification from the hearing device 100 as a result. Accordingly embodiments of the present invention provide the ability to detect (identify) clogging in a microphone 114 and send notification of such to a user of the hearing device 100. As a result of detection and/or diagnosis concluding blockage (clogging or partial clogging) of a microphone 114 of a hearing device 100, the system may send notification to a user to clean up the microphone port and/or clean up or replace a screen or filter through which sound travels to reach the microphone 114, in an effort to reduce or eliminate the clogging. In this way the system allows the user to carry out maintenance that can keep the hearing device operating without the need to send it in for repair or replacement. This can also reduce future incidents of reduced amplification as well as lessen the risk of hearing aids being damaged to a point of complete failure, which can otherwise occur if clogging problems are not addressed before wax works its way into the component to destroy its ability to function. Like the previously described tests, a microphone clogging test or check can be done by initiating it manually from a computing device 300 or from the base unit 200, or automatically when the hearing device 100 is placed in the cradle of the base unit 200. A microphone clogging test can be self-initiated in the base unit 200 as part of self-diagnostic check or can be done by connecting the base unit 200 with a computing device 300. Further alternatively, a microphone clogging test could be initiated by a computing device 300, sent to hearing devices 100 to execute even when the hearing devices are not positioned in the cradle 200. In this alternative, the computing device 300 may send a test initiation command directly to the hearing device 100 via communication 332 using any of the communication modalities already described above FIG. 8 shows a block diagram of system 1000 illustrating various features that may be employed for executing a procedure to detect and diagnose causes of subpar performance of a hearing device, according to embodiments of the present invention. FIG. 8 is provided for reference in particular to testing that can be executed to detect and diagnose causes of subpar performance from the microphone 114 of the hearing device 100.

As noted, microphone clogging is a major cause of user complaints of reduced/no amplification from a hearing device. By providing system 1000, a method of detecting clogging/blockage can be executed and the system can notify the user to clean the microphone 114 port and/or clean or change a wax filter or component that includes a wax filter. The clogging detection method can then be re-executed on the hearing device 100 to see if the changes made have improved the status of the hearing device 100 such that the microphone 114 is no longer being considered as clogged by the detection method. This testing and maintenance can have a significant impact on a continued improved listening experience to the user; and can lessen incidents of reduced amplification as well as less risk of hearing devices getting damaged to a point of complete failure. As methods of detecting and diagnosis, as well as simple cleaning and or wax filter and/or cap replacement procedures can be carried out by the user with the aid of the inventive system, they can also significantly reduce the number of returns of hearing devices to a professional or the manufacturer, as many instances can be resolved at the user end, leading to reduced overall expenses of the hearing devices, and less inconvenience to the user as the user will less often need to send in one or more hearing devices.

In some embodiments, where a computing device 300 is used in the system 1000, an app 322 may be executed on the computing device to initiate the detection method. In one non-limiting example, the user may initiate a "hearing device microphone clogging test" on the app 322. The computing device 300, via the app 322 sends a command over the communication channel 330 to the base unit 200, e.g. via BLE communication or any of the alternative communication types discussed above. The base unit 200 relays the command to the hearing device(s) 100 placed in the cradle 204 leveraging a communication protocol 230, such as a proprietary charger communication protocol (ECC), a Bluetooth low energy (BLE) communication, a wired or ultrasonic communication, a communication over W-Fi, or the like. Alternatively, the computing device 300 may send a test initiation command directly to the hearing device(s) 100 via communication 332 using any of the communication modalities already described above. Communication via 332 may be performed simultaneously with communication via 330 to base unit 200.

Whether initiated by communication from computing device 300 to base unit 200 and then to hearing device(s) 100, by communication from base unit 200 (either automatically initiated by placement of hearing device 100 in cradle, by manual actuation 228 or by connecting to a computing device 300) to hearing device(s) 100 or by communication from computing device 300 via communication channel(s) 332 to hearing device(s) 100, the initiating communication instructs the sound processor of one of the hearing devices 100 to output frequency sweeping tones that are played out from its receiver 118. The frequency sweeping tones may be the same as or different from those used in the receiver clogging test. In at least one embodiment, the outputted frequency sweeping tones from the receiver from the one hearing device 100 are received by the microphone 114 of the other hearing device 100 via acoustic path 135. In a preferred embodiment, the signal energy levels of reference audio signals are computed and stored in memory to be used for comparison during testing. Similarly, the signal energy levels of the test audio signals are computed, and these levels are compared to the signal energy levels of the reference audio signals. The results of the comparison are used to determine whether significant clogging exists.

The received frequency sweeping tones are compared as calculated test audio signal energy levels to the reference audio signal energy levels that may be stored in memory 132 of the hearing device 100 housing the sound processor 119 and the microphone 114 being tested. Alternatively the reference audio signal energy levels could be communicated from memory 222, 324, or another external memory. The processor 119 may compare the test audio signal energy levels to the reference audio signal energy levels and identify whether one or more frequencies is not within the threshold level expected.

The threshold upon which a diagnosis of blockage is made may be one or more predetermined values and may vary, but is/are typically fixed once the predetermined value(s) have been decided upon. For example, blockage may be determined when one or more signal energy levels of the tonal frequencies in the test signal is 10 dB, 15 dB, 20 dB, 25 dB or more, or any value in between these values, lower than the signal energy level of the corresponding tonal frequency in the reference signal. Furthermore, these values are exemplary only, as other predetermined values could be substituted. However, the predetermined values are typically set prior to making a comparison of a signal energy level of a test audio signal to a signal energy level of the reference audio signal. Optionally, the number of test frequencies that are outside of the threshold difference may be considered when deciding whether a blockage is to be diagnosed. For example, if only one tonal frequency is outside the threshold, then this may not be enough to trigger a diagnosis of potential blockage. Thus, 2, 3, 4 or more frequencies of test signals may need to be outside of the threshold levels before a determination is made that the receiver is potentially blocked. Further alternatively, different weights may be applied to different test frequencies, which are applied in a formula to calculate when a diagnosis of potential blockage is to be made. In these instances, frequencies in the normal range of human speech may be assigned higher weights than frequencies outside of the normal range of human speech, so that frequencies inside the normal range of human speech, when produced at levels below the threshold values, are more likely to result in a diagnosis of potential blockage. Further alternatively, the threshold deltas between the levels of the reference audio signals and the test audio signals may vary from frequency to frequency. As a non-limiting example, the threshold values for frequencies within the range of human speech may be closer to the reference values than the threshold values of frequencies outside the range of human speech.

Figure 9:
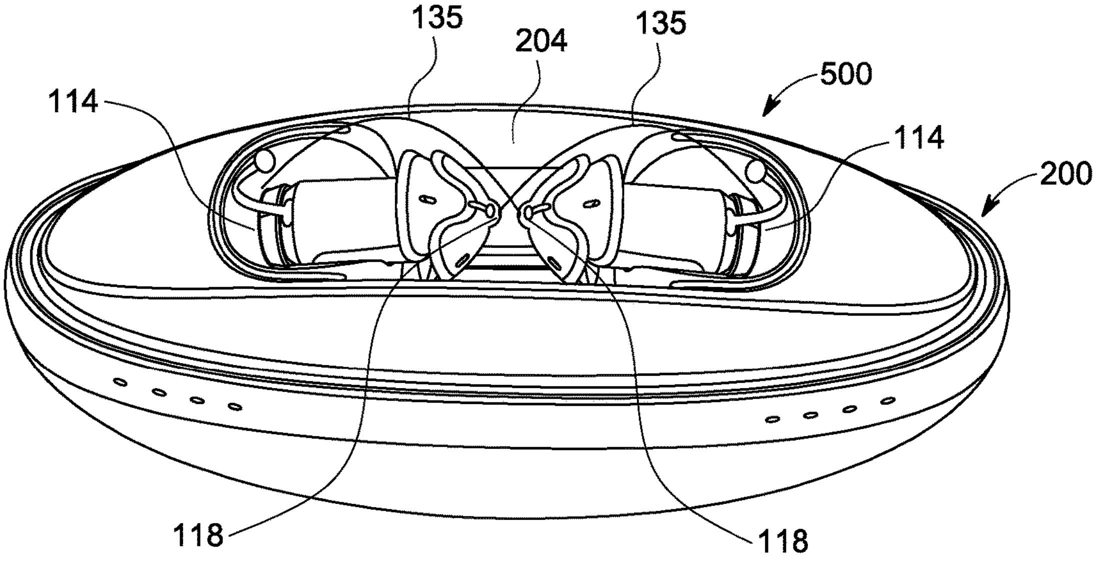
FIG. 9 shows a pair of hearing devices received in the cradle of a base unit, according to an embodiment of the present invention.
Figure 10:
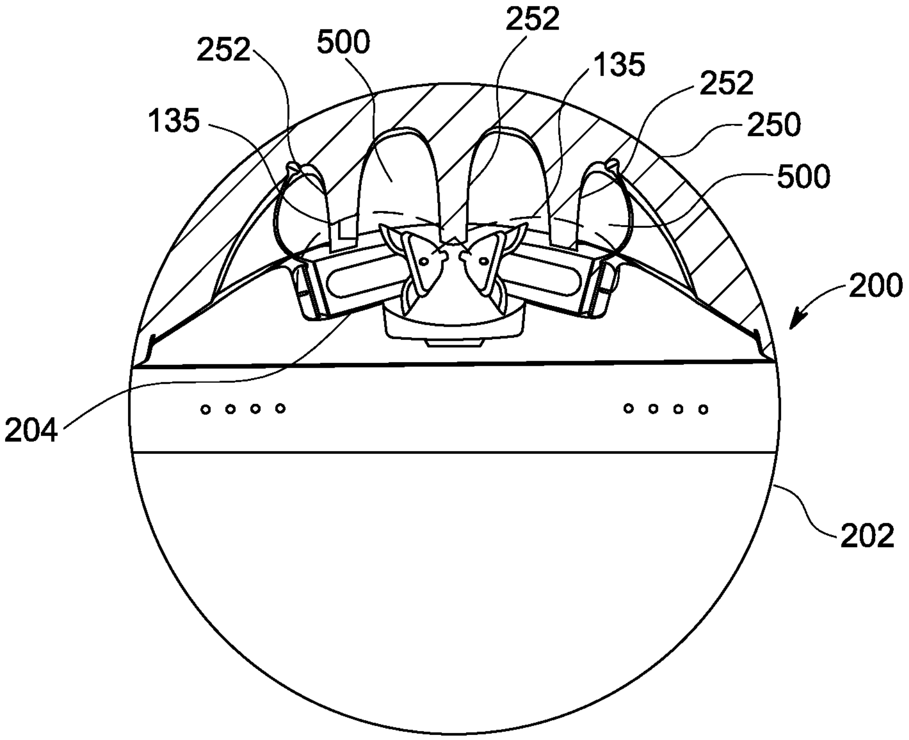
FIG. 10 shows a cutaway view of a lid having been placed over the main body of the base unit of FIG. 9, to enclose the hearing devices, while at the same time maintaining space for open communication between receivers and microphones, according to an embodiment of the present invention.
Figure 11:
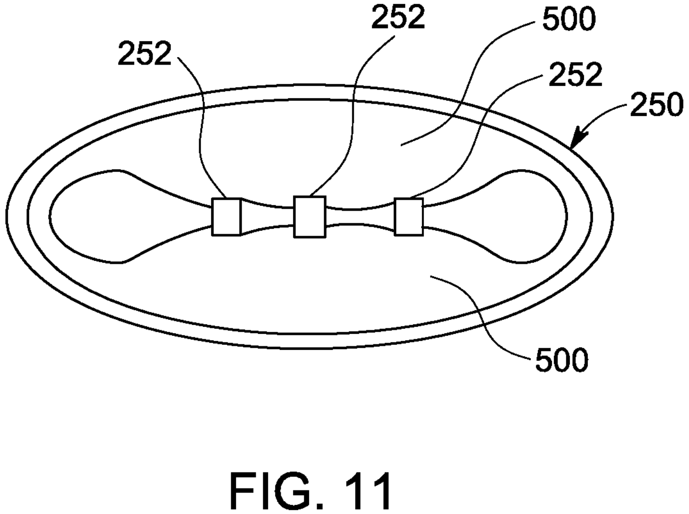
FIG. 11 is a bottom view of the lid of FIG. 10.

The receiver 118 of the hearing device in which the microphone 114 is being clog tested may be temporarily disabled during the testing, or may be left functioning to output the audio test signals. Alternative to this embodiment, frequency sweeping tones may be outputted from both receivers 118 to be received by the microphone 114 of the hearing device 100 being currently clog tested. Further alternatively, frequency sweeping tones may be outputted only from the receiver 118 of the hearing device 100 having the microphone being clog tested. Because the cradle 204 is an open cavity, the receiver 118 and microphone 114 remain in open acoustic communication with one another, as a space exterior of the base unit 200 is continuous with the opening of the cradle. FIG. 3 illustrates the open cavity provided by the cradle 204 and FIG. 9 shows that when received in the cradle 204, the microphones 114 and receivers 118 as well as the microphones 206 remain in open communication with the space 500 exterior of the housing 202 of the base unit 200 and in open communication with one another. Likewise, even when a lid (see FIG. 10) is placed over the main body 202 of the base unit 200, cradle 204 and hearing devices 100, the open space 500 is maintained under the lid so that open acoustic paths 135 are maintained. Although columns 252 may be provided to extend down into the space provided by the lid 250 so as to assist in maintaining the hearing devices 100 in there intended positions in the cradle 204 of the base unit 200, the columns are narrow in width, relative to the width of the space 500 within the lid, as illustrate in the bottom view of FIG. 11. Thus, the columns do not prevent the open acoustic communication between the receivers and microphones via pathways 135 as illustrated in FIG. 10. Accordingly the acoustic paths 135 flow freely through the open space 500 between receiver 118 and microphone 114. Further advantageously, the hearing devices 100 are positioned in the cradle 204 such that the receivers 118 face one another and each receiver 118 points in a direction toward the microphone 114 of the opposite hearing device, respectively. This helps direct the output from the receiver 118 toward the microphone 114 of the opposite hearing device.

The outputted tones received by microphone 114 are outputted to processor 119. These signals outputted from microphone 114 to processor 119 are referred to a test audio signals, and may be digital test audio signals when the microphone 114 is a digital microphone and performs A/D processing of the outputted tones that it receives. Alternatively an A/D converter may be integrated in the sound processor 119 where the signals are converted to digital test audio signals. In any case, signal energy levels of the digital test audio signals are compared with signal energy levels of digital reference audio signals, as noted above. Alternatively, the digital test audio signals may be sent to processor 326 of computing device or processor 214 of base unit 200 for comparison of signal energy levels with the signal energy levels of the reference audio signals.

By comparing the output levels of the various frequencies of tones transmitted in the test audio signals to the levels of the reference signals at the same frequencies, detection of microphone blocking can be identified in instances where one or more frequencies of the test audio signal has a level that is significantly below the reference level at the same frequency(ies). Note that the reference audio signals have levels that are expected when no blockage is occurring at the microphone location.

The signal energy levels of the test audio signals (in dB or linear units) are compared with the signal energy levels of the corresponding frequencies of the reference signals. Determinations as to whether clogging exists can be based upon the same comparison analysis that is used when testing for receiver clogging. If the test audio signals fail to meet the threshold test for signals that are considered to be produced by a microphone that is not clogged, then the system diagnoses the microphone 114 as clogged or partially clogged. In response to this finding, a user could then clean the microphone 114 port, clean or replace a wax filter through which sound travels to enter the microphone, and/or clean or replace a cap that covers the microphone and through which sound must pass to reach the microphone 114, or other cleaning or replacement procedures that could readily be carried out at the user end. After this the microphone 114 can then be clog tested again in the same manner described above. If the test signals are within a predefined threshold of level difference from the reference signals, then it can be concluded that the cleaning and/or replacement procedures that the user carried out were successful, and that there is no longer currently a blockage problem with regard to the microphone. If the test signals are still not within threshold levels, then the user could attempt further cleaning and/or replacement procedures as noted and run the test again, or seek professional assistance in solving the problem. If the decision is made to try and do further cleaning and/or replacement, then another microphone clogging test is executed thereafter to see if the microphone 114 now passes the blockage detection test. Results of test comparisons can be sent to the computing device 300 and displayed and/or audibly output to the user. Alternatively or additionally, results can be displayed and/or audibly output through the base unit 200. Logs of microphone and receiver test results can be saved in one or more of memories 324, 222 and/or 132. In one embodiment, the app 322 can be configured to track the history of the tests executed to provide further analysis, such as trends, etc.

It is preferred that at least the receiver clogging test is run on the receiver(s) used to provide the signals for the microphone clog test, prior to executing the microphone clog test, to eliminate the receiver(s) as being the source of any degradation in the levels of the test audio signals. Additionally, a receiver damage test may be executed on each receiver providing input to the microphone 114 to be clog tested, prior to the clog testing of the microphone 114. The threshold(s) upon which potential microphone 114 blockage may be detected/diagnosed may be the same as or different from those used to detect/diagnose potential receiver blockage. Likewise the number of test frequencies required to be outside of threshold values to reach a conclusion of potential microphone blockage 114 may be the same as, or different from those used for receiver clogging testing, but are predetermined. Likewise, different weights may be applied to different test frequencies, which are applied in a formula to calculate when a diagnosis of potential blockage of a microphone 114 is to be made. Also, the threshold deltas between the reference audio signals and the test audio signals may vary from frequency to frequency.

Figure 12:
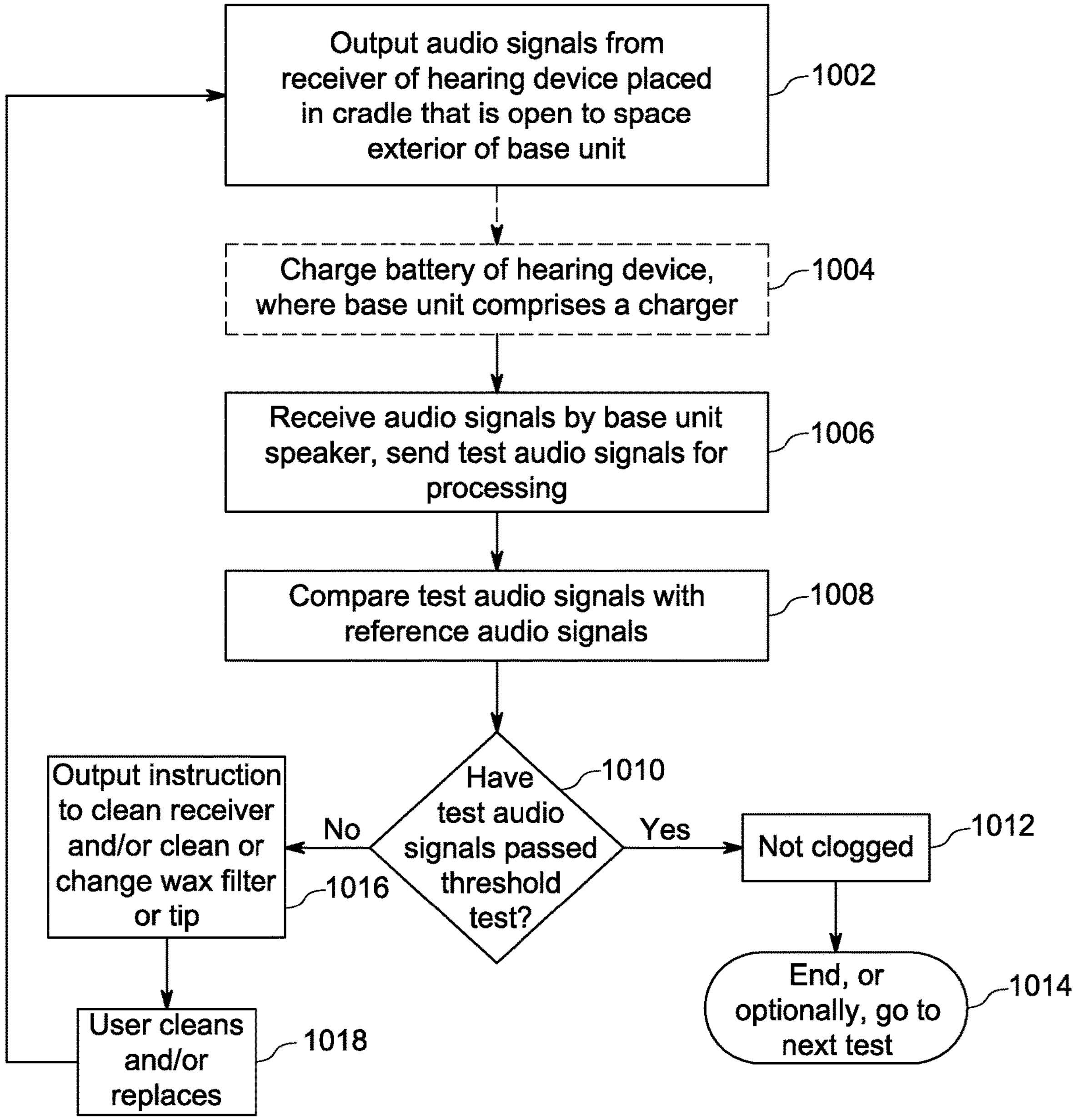
FIG. 12 is a flow chart showing events that may be carried out during execution of a method of detecting and diagnosing causes of subpar performance of a hearing device according to embodiments of the present invention.

FIG. 12 is a flow chart showing events that may be carried out during execution of a method of detecting and diagnosing causes of subpar performance of a hearing device according to embodiments of the present invention. Although the events in FIG. 12 are listed and described sequentially, it is noted that some events may be executed in a different order than that shown and/or in parallel. Also in various embodiments, one or more of the events listed may be omitted or repeated. Thus the order of the events listed should not be construed to be necessarily limiting to the scope of the present invention.

At event 1002, a hearing device 100 having been placed in the cradle 204 of a base unit 200 is operated to output audio signals from receiver 118 of the hearing device 100. The cradle 204 is configured so that it remains open to space external of the base unit 200, so that the cradle, receiver 118 (and microphone 114 for embodiments having a microphone) remain in open acoustic communication with the space outside the base unit 200 and with each other after the hearing device 100 has been placed in the cradle. As noted previously, in embodiments where a lid is closed over the cradle 204 and hearing device(s) 100, the external space is still maintained so that the acoustic pathways remain open. In embodiments with a closed lid, this provides additional isolation from external noises (outside of the lid and base unit 200) while maintaining the open space beneath the lid to enable the acoustic pathways between the receiver 118 and microphone 114.

Optionally, event 1004 notes that in embodiments where the base unit 200 comprises a charger, the battery of the hearing device 100 may be charged by the charger. Charging may initiate automatically at the time that the hearing device 100 is received in the cradle 204. Alternatively, charging may be interrupted during execution of testing the hearing device, and then resume upon completion of testing. Further optionally, charging schedules may be manually controlled or programmed for custom charging times.

The audio signals outputted by receiver 118 are received by a base unit microphone 206 as inputted audio signals at event 1006 in the open air acoustic communication between receiver 118 and base unit microphone 206 sends test audio signals resulting from the inputted audio signals, to a processor for processing the test audio signals, including, but not necessarily limited to, calculating energy levels (signal energy) of the test audio signals.

At event 1008, the signal energy levels of the test audio signals are compared with signal energy levels of reference audio signals by a processor, which may be located in the base unit 200, or computing device 300. As noted above the signal energy levels of the various frequencies of the test audio signals are compared with the signal energy levels of the reference signals having the same respective frequencies. If the test audio signals are found through comparison to have passed the threshold test the receiver is determined to be acceptable so as not to be significantly clogged or block and is considered to be suitable, as to wax buildup and clogging issues, so as to not require cleaning or replacement at this time. The determination can be outputted to a computing device 300 and/or base unit 200 at event 1012 in any of the manners described above. At event 1014, the processing may then end, or optionally proceed to execute another test such as a receiver damage test or a microphone clogging test.

If at event 1010 the test audio signals have been found to have failed the threshold test, then the system then determines that the receiver has a clogged or partially clogged status and outputs instructions to a user to clean the receiver 118 and/or clean or change a wax filter or tip component that includes a wax filter. The instructions can be outputted to a computing device 300 and/or base unit 200 at event 1016 in any of the manners described above.

At event 1018, the user services the hearing device by cleaning the receiver 118 and/or cleaning or changing a wax filter or tip component that includes a wax filter through which the receiver 118 outputs sound. After the servicing at event 1018, processing returns to event 1002 to rerun the receiver clogging test. Alternatively, at event 1016, the process may end and the process may be newly initiated at event 1002 after the user cleans and/or replaces at event 1018. Optionally, a counter or flag may be tracked in the process to keep track of how many times events 1016 and 1018 haven been executed, so that after a predetermined number of times executing these events, if the test audio signals still do not pass the threshold test, then the system outputs an instruction suggesting that the user send the hearing device 100 in or take it to a professional for further evaluation and servicing and/or replacement. Alternatively, the user may decide after repeating event 1018 for a number of times that the user servicing will not be successful, wherein the user can consult a professional for further guidance.

Figure 13:
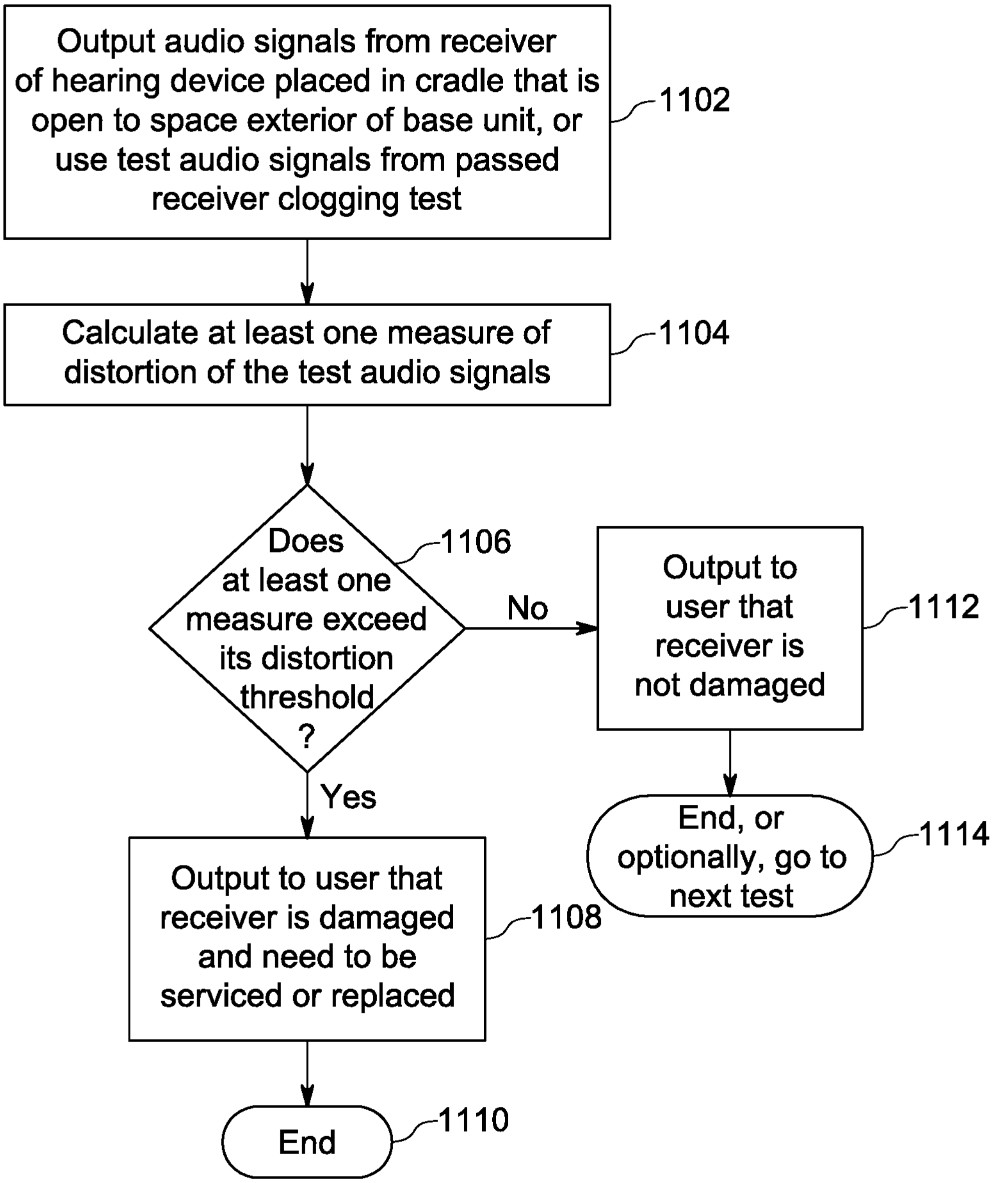
FIG. 13 is a flow chart showing events that may be carried out during execution of a method of detecting and diagnosing causes of subpar performance of a hearing device according to embodiments of the present invention.

FIG. 13 is a flow chart showing events that may be carried out during execution of a method of detecting and diagnosing causes of subpar performance of a hearing device according to embodiments of the present invention. Although the events in FIG. 13 are listed and described sequentially, it is noted that some events may be executed in a different order than that shown and/or in parallel. Also in various embodiments, one or more of the events listed may be omitted or repeated. Thus the order of the events listed should not be construed to be necessarily limiting to the scope of the present invention.

At event 1102, a hearing device 100 having been placed in the cradle 204 of a base unit 200 is operated to output audio signals from receiver 118 of the hearing device 100. The cradle 204 is configured so that it remains open to space external of the base unit 200, so that the cradle, receiver 118 (and microphone 114 for embodiments having a microphone) remain in open acoustic communication with the space outside the base unit 200 and with each other after the hearing device 100 has been placed in the cradle. Alternatively, and preferably, a lid 250 may be closed over the top of the base unit 200, cradle 204 and hearing device(s) 100 while still maintaining the open external space 500 above the cradle 204 and hearing device(s) 100, but beneath the lid. This helps to provide isolation from sounds generated outside of the lid 250, while still allowing open communication between the receiver(s) and microphone(s) of the hearing devices. Alternatively, such as in instances where the receiver 118 of the hearing device 100 has just been tested for receiver clogging and has passed the receiver clogging test, the test audio signals compared in the receiver clogging test that passed can be used as the test audio signals at events in lieu of event 1102 (as following event 1014 in FIG. 12).

At event 1104, at least one measure of distortion of the test audio signals is calculated by a processor, which may be a processor associated with the base unit 200 or computing device 300. As noted above, types or measures of distortion that may be calculated include, but are not limited to THD or DFD. If at least one of the measures of distortion exceeds its predetermined threshold value when compared therewith at event 1106, then the system 100 determines that receiver damage has occurred to the receiver 118 of the hearing device 100 being tested.

At event 1108 a message is displayed and or audibly sent to the user (using any one, any combination or all of the previously described methods) that the receiver has been damaged and needs to be serviced or replaced.

Notifications may optionally provide the user with locations and/or contact information of professionals to send to take the hearing device 100 to for further testing, servicing and/or replacement. At event 1110 the process ends.

If no measure of distortion exceeds its predetermined distortion threshold at event 1106, then the system 1000 determines that receiver damage does not exist at this time and notification is sent, displayed and/or played to the user at event 1112 that the receiver 118 of the hearing device is not damaged and that the user can continue to use it.

At event 1114, the processing may then end, or optionally proceed to execute another test such as a microphone clogging test on the same hearing device 100 or a receiver clogging test or receiver damage test on a second hearing device 100 that has also been placed in the cradle 204.

Figure 14:
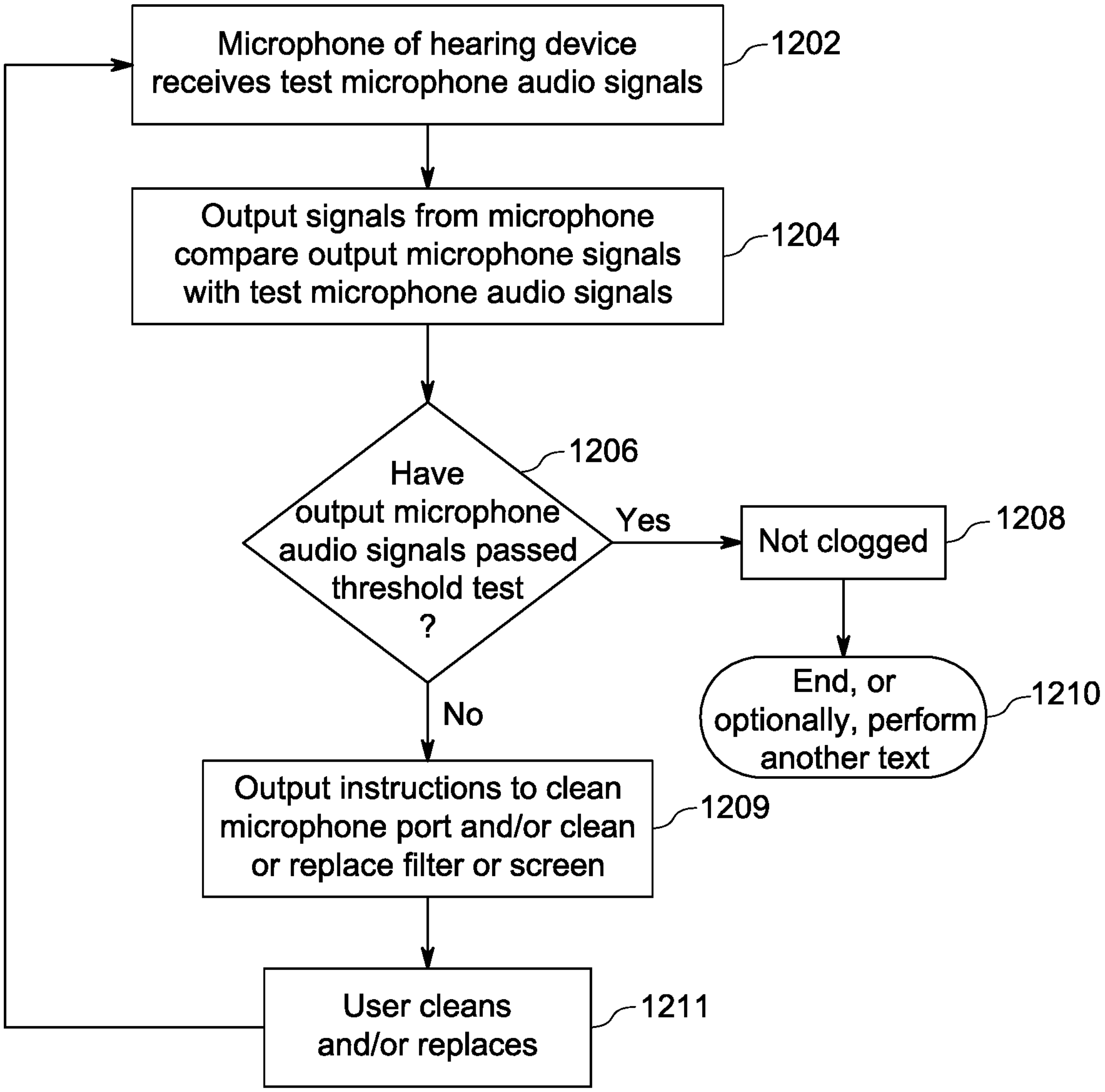
FIG. 14 is a flow chart showing events that may be carried out during execution of a method of detecting and diagnosing causes of subpar performance of a hearing device according to embodiments of the present invention.

FIG. 14 is a flow chart showing events that may be carried out during execution of a method of detecting and diagnosing causes of subpar performance of a hearing device according to embodiments of the present invention. Although the events in FIG. 14 are listed and described sequentially, it is noted that some events may be executed in a different order than that shown and/or in parallel. Also in various embodiments, one or more of the events listed may be omitted or repeated. Thus the order of the events listed should not be construed to be necessarily limiting to the scope of the present invention.

At event 1202, a microphone 114 of a hearing device 100 receives test microphone audio signals to be used for clog testing the microphone 114 according to embodiments of the present invention. The hearing device 100 will have been placed in the cradle 204 of a base unit 200 prior to event 1202. Further preferably, but not necessarily, a second hearing device 100 will also have been placed in the cradle 204 prior to event 1202. As noted above the test microphone audio signals may be outputted from the receiver 118 of the second hearing device 100 and received by the microphone 114 of the first hearing device 100. Alternatively, receivers 118 from both the first and second receivers 118 may output the test audio signals that are received by the microphone 114 of the first hearing device. Still further alternatively, the receiver 118 of the first hearing device 100 may be used alone to output the microphone test audio signals to the microphone 114 of the first hearing device. Likewise, when testing the microphone 114 of the second hearing device, the microphone test audio signals are preferably sent to the microphone 114 of the second hearing device 100 from the receiver 118 of the first hearing device 100, but could alternatively be sent from both receivers 118, or the receiver 118 of the second hearing device 100 alone. In all cases where the hearing devices 100 have been placed in the cradle 204, the cradle 204 and devices 100 remain open to a space external of the base unit 200 so that all receivers 118 and microphones 114 have open acoustic communication with one another via the external space and opening thereto. Preferably a lid 250 will have been closed over the base unit 200, cradle 204 and hearing device(s) 100 to maintain the open space above the cradle 204 and hearing device(s) 100, as noted above, but to help prevent sounds external of the lid 250 and base unit 200 from entering the space beneath the lid. Optionally the receiver 118 of the hearing device 100 of which the microphone 114 is being clog tested may be blocked from outputting to prevent feedback from output generated by the microphone 114 as a result of receiving the test microphone audio signals.

As with a receiver clogging test, as well as with a receiver damage test, a microphone clogging test can execute simultaneous with the charging of the hearing device(s) 100 when the base unit comprises a charger. Alternatively, charging can be paused during execution of a microphone clogging test, similar to previous tests described and/or customized charging routine may be programmed. Further alternatively charging may be manually controlled by the user.

At event 1204, after calculating signal energy levels of the signals outputted by the microphone 114 being tested, the signal energy levels of the signals outputted by the microphone 114 being tested are compared with the signal energy levels of the test microphone audio signals at the same respective frequencies. Processing, such as calculating signal energy levels of the signals outputted by the microphone 114, and comparison of the signal energy levels of the signals, is preferably executed by a processor 119 in the same hearing device 100 of which the microphone 114 is being clog tested. Alternative, but less preferred options may be to transmit the raw audio data from the microphone to a processor of the base unit 200, computing device 300, or even the other hearing aid 100 to execute the signal energy level comparisons. The signal energy levels of the test microphone audio signals and their frequencies may be stored in memory 133 or any other memory accessible by the processor executing this step.

At event 1206 the comparisons results are evaluated to determine whether the output microphone audio signals have passed the threshold test. The parameters for predetermined threshold(s) and criteria for signals passing the threshold test may be any of those previously discussed.

If the test audio signals are found through comparison to have passed the threshold test, the tested microphone 114 is determined to be acceptable so as not to be significantly clogged or blocked and is considered to be suitable, as to wax buildup and clogging issues, so as to not require cleaning or replacement at this time. The determination can be outputted to a computing device 300 and/or base unit 200 at event 1208 in any of the manners described above. At event 1210, the processing may then end, or optionally proceed to execute another test such as a microphone clogging test on the microphone 114 of the other hearing device 100, or a receiver clogging test on a receiver 118 of a receiver to be used to output test microphone audio signals to the microphone 114 of the next microphone 114 to be clog tested.

If at event 1206 the output microphone audio signals have been found to have failed the threshold test, the system then determines that the microphone 114 has a clogged or partially clogged status and outputs instructions to a user at event 1209 to clean up the microphone port and/or clean up or replace a screen or filter through which sound travels to reach the microphone 114 in an effort to reduce or eliminate the clogging. The instructions can be outputted to a computing device 300 and/or base unit 200 at event 1209 in any of the manners described above.

At event 1211, the user services the hearing device 100 by cleaning the microphone 114 port and/or cleaning or changing a wax filter or cap that includes a wax filter or other passageway(s) through which sound passes to reach the microphone 114. After the servicing at event 1210, processing returns to event 1202 to rerun the microphone clogging test. Alternatively, at event 1209, the process may end and the process may be newly initiated at event 1202 after the user cleans and/or replaces at event 1211. Optionally, a counter or flag may be tracked in the process to keep track of how many times events 1209 and 1211 haven been executed, so that after a predetermined number of times executing these events, if the output microphone audio signals still do not pass the threshold test, then the system outputs an instruction suggesting that the user send the hearing device 100 in or take it to a professional for further evaluation and servicing and/or replacement. Alternatively, the user may decide after repeating event 1211 for a number of times that the user servicing will not be successful, wherein the user can consult a professional for further guidance.

Figure 15:
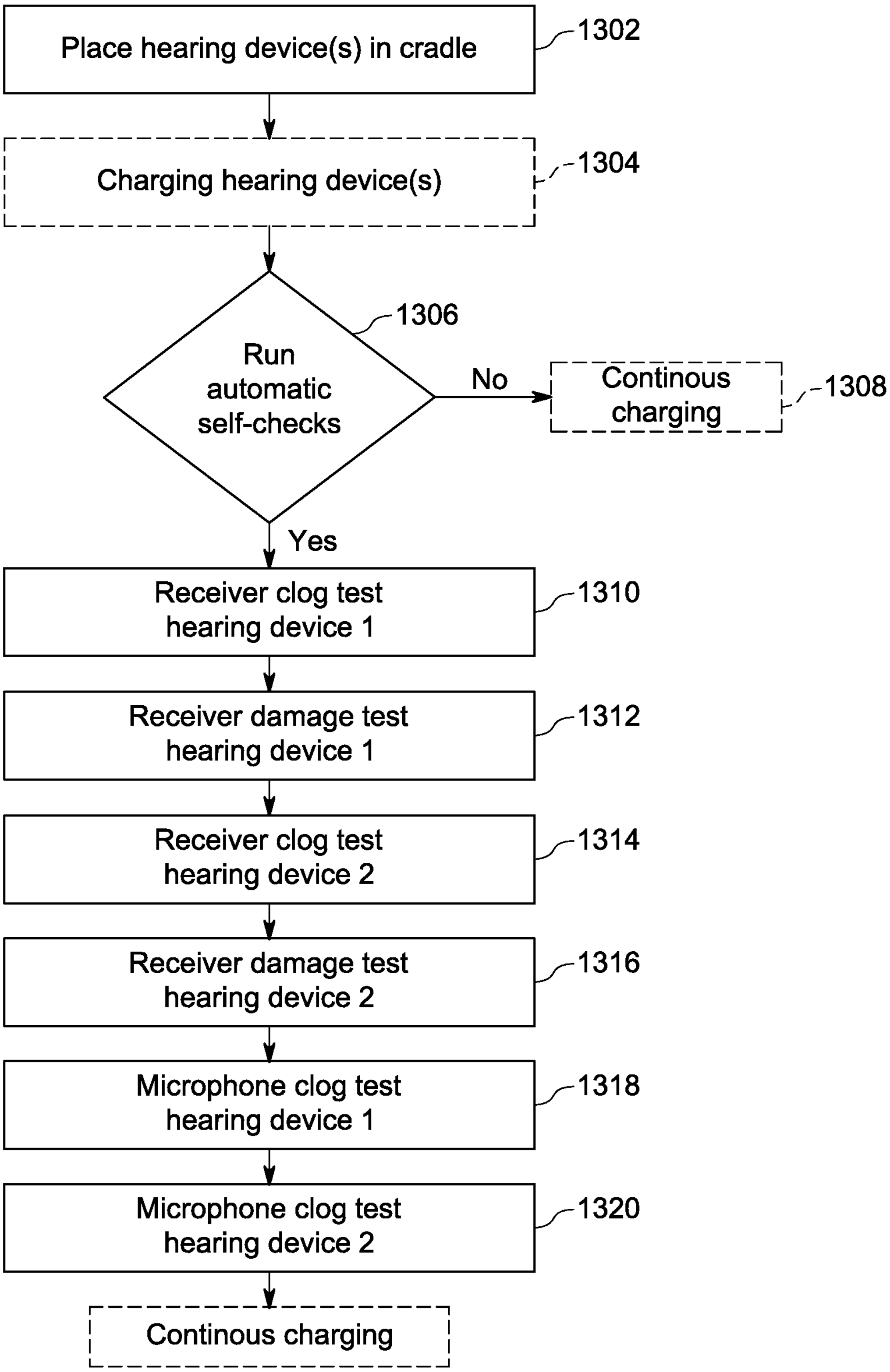
FIG. 15 is a flow chart showing events that may be carried out during execution of a method of automatically self-testing one or more hearing devices to detect and diagnose causes of subpar performance or confirm that the device(s) is/are within acceptable operating standards, according to embodiments of the present invention.

FIG. 15 is a flow chart showing events that may be carried out during execution of a method of automatically self-testing one or more hearing devices 100 to detect and diagnose causes of subpar performance or confirm that the device(s) is/are within acceptable operating standards, according to embodiments of the present invention. Although the events in FIG. 15 are described with regard to a pair of hearing devices 100, it is noted that these events may also be carried out on a single hearing device. Although the events in FIG. 15 are listed and described sequentially, it is noted that some events may be executed in a different order than that shown and/or in parallel. Also in various embodiments, one or more of the events listed may be omitted or repeated. Thus the order of the events listed should not be construed to be necessarily limiting to the scope of the present invention.

At event 1302, one, or more typically, two hearing devices 100 are placed in the cradle 204 of a base unit 200.

Optionally, event 1304 notes that in embodiments where the base unit 200 comprises a charger, the battery(ies) of the hearing device(s) 100 may be charged by the charger.

Charging may initiate automatically at the time that the hearing device(s) 100 is/are received in the cradle 204. Alternatively, charging may be interrupted during execution of testing the hearing device(s), and then resume upon completion of testing. Further optionally, charging schedules may be manually controlled or programmed for custom charging times.

At event 1306 the processor of the base unit 200 (or alternatively, processor of computing device 300 or one or more processors of hearing devices 100) determined whether an automatic self-check of the hearing device(s) should be run. In this regard, the system 1000 may be programmed so that a self-check is done for maintenance purposes on a regular schedule, such as every time the hearing device is placed in the cradle 204 and a predetermined period has passed since the last self-check was performed. The predetermined period may be set to any time period, e.g., 12 hours, 24 hours, 2 days, 3 days, 1 week, etc. If the predetermined time period has not yet passed since the last self-check, then a self-check is not carried out at this time and optionally, the device(s) continue to charge at event 1308.

If the hearing device(s) has not been self-checked with the last predetermined time period, then the self-check detection and diagnostic methods are automatically run on the hearing device(s) 100. At event 1310 a receiver clog test is run on a first hearing device 100 such as is described in regard to FIG. 12. It is noted here that the events of FIG. 15 may all be carried out automatically, as long as all components being tested pass all tests. That, is, the full routine of self-testing may be automatically carried out without any user intervention or participation if everything is within acceptable operating standards. The system may output the passed test results for each test conducted to confirm to the user the that hearing device(s) passed the tests and can continue to be used without the need to any cleaning, replacing or other servicing. If a test fails, then user intervention will be required as noted in the descriptions of the previous tests described with regard to FIGS. 10-12. If a failed test can be corrected by the user interventions, then the tests of FIG. 15 can resume being automatically performed.

After passing the receiver clogging test, a receiver damage test can be automatically executed on the receiver 118 of the first audio device at event 1312. When a pair of hearing devices 100 has been placed in the cradle 204, as most often is the case, then a receiver clog test can be performed on the receiver 118 of the second hearing device at event 1314. After passing this test, a receiver damage test can be run with regard to the receiver 118 of the second hearing device 100 at event 1316.

With both receivers 118 having been confirmed to be operating according to acceptable parameters, microphone clog tests can now be run. Alternatively, a microphone clog test for the second hearing device 100 could be run after confirming the receiver tests pass for the first hearing device.

At event 1318 a microphone clog test is done on the microphone 114 for the first hearing device 100. At event 1320 a microphone clog test is done on the microphone 114 for the second hearing device 100. As each test is passed, the system 1000 may output to the user a confirmation of passing that particular test. After event 1320, the base unit 200 may continue charging the hearing device(s) 100 and the system may output to the user that the hearing device(s) are fully functional and operating within acceptable parameters so that no cleaning or replacement of parts, or further testing is needed at this time.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, device, apparatus, process, process step or steps, to the objective, spirit and scope of the present invention. All such modifications are intended to be within the scope of the claims appended hereto.

That which is claimed is:

1. A method of detecting and diagnosing causes of subpar performance of a hearing device, said method comprising:

receiving test microphone audio signals by a microphone of a hearing device placed in a cradle of a base unit;

processing microphone audio signals outputted by the microphone in response to receiving the test microphone audio signals to compare signal energy levels of said test microphone audio signals with signal energy levels of said microphone audio signals; and indicating that a blockage of the microphone has occurred when a difference between one or more of said signal energy levels of said test microphone audio signals and said signal energy levels of said microphone audio signals exceeds a predetermined microphone threshold difference.

2. The method of claim 1, further comprising charging the hearing device placed in the cradle with the base unit.

3. The method of claim 1, wherein said test microphone audio signals are outputted by the receiver of the hearing device.

4. The method of claim 1, wherein two hearing devices are placed in the cradle of the base unit, the hearing device is a first hearing device and a second of the two hearing devices is a second hearing device; and wherein said test audio signals are outputted by a receiver of the second hearing device.

5. The method of claim 1, wherein two hearing devices are placed in the cradle of the base unit, the hearing device is a first hearing device and a second of the two hearing devices is a second hearing device;

wherein said test audio signals are outputted by a receiver of the second hearing device and the receiver of the first hearing device.

6. The method of claim 1, further comprising:

notifying a user and recommending cleaning the microphone or a microphone filter, or replacing the microphone filter through which the sound passes into the microphone, when said difference between one or more of said signal energy levels of said test microphone audio signals and said signal energy levels of said microphone audio signals exceeds said microphone threshold difference.

7. A system for detecting and diagnosing causes of subpar performance of a hearing device, said system comprising:

said hearing device comprising a housing, a receiver, a sound processor configured to send signals to said receiver, said receiver configured to output audio signals from said signals sent by said sound processor, and a microphone configured to input microphone audio signals to said sound processor in response to test microphone audio signals received by said microphone;

a base unit comprising a main body having a cradle formed therein, said cradle configured to receive said hearing device therein, and a processor associated with said system and configured to compare signal energy levels of said test microphone audio signals received by said microphone with signal energy levels of said microphone audio signals, and to indicate a blockage of the microphone has occurred when a difference between one or more of said signal energy levels of said test microphone audio signals and said signal energy levels of said microphone audio signals exceeds a predetermined microphone threshold difference.

8. The system of claim 7, further comprising a lid configured to be placed over said main body, said cradle and said hearing device.

9. The system of claim 7, wherein said base unit is configured to charge said hearing device when said hearing device is received in said cradle.

10. The system of claim 7, wherein said cradle of said main body is configured to at least partially receive two of said hearing devices therein.

11. The system of claim 10, wherein said hearing device comprises a first hearing device, said housing comprises a first housing, said receiver comprises a first receiver, said sound processor comprises a first sound processor, said microphone comprises a first microphone and said input microphone audio signal comprise first input microphone audio signals;

said system further comprising a second hearing device comprising a second housing, a second receiver, a second sound processor configured to send second signals to said second receiver, said second receiver configured to output second output audio signals, and a second microphone configured to input second microphone audio signals to said second sound processor;

wherein said system is configured to control at least one of said first and second hearing devices to output at least one of said first and second audio signals, wherein said first microphone receives said at least one of said first and second audio signals as said test microphone audio signals and generates said first input audio signals therefrom.

12. The system of claim 11, wherein said processor configured to compare signal energy levels of said test microphone audio signals with signal energy levels of said first microphone audio signals comprises said first sound processor.

13. The system of claim 11, wherein said processor configured to compare signal energy levels of said test microphone audio signals with signal energy levels of said first microphone audio signals comprises a processor located in said base unit.

14. The system of claim 11, further comprising a computing device, wherein said computing device is configured to be communicatively coupled to at least one of said base unit and said hearing devices; and wherein said processor configured to compare signal energy levels of said test microphone audio signals with signal energy levels of said at least one of said first microphone audio signals comprises a processor located in said computing device.

15. The system of claim 14, wherein said computing device comprises a smart phone, tablet or personal computer (PC).

16. The system of claim 14, wherein said computing device is configured to communicatively couple to said at least one of said base unit and said hearing devices via Bluetooth communication.

* * * * *